US008311025B2

(12) United States Patent
Lin et al.

(10) Patent No.: US 8,311,025 B2
(45) Date of Patent: Nov. 13, 2012

(54) METHOD, DATA STRUCTURE AND COMPUTER SYSTEM FOR PACKING A WORLDWIDE INTEROPERABILITY FOR MICROWAVE ACCESS (WIMAX) FRAME

(75) Inventors: Bo Lin, East Kilbride (GB); Wim Rouwet, Glasgow (GB)

(73) Assignee: Freescale Semiconductor, Inc., Austin, TX (US)

( * ) Notice: Subject to any disclaimer, the term of this patent is extended or adjusted under 35 U.S.C. 154(b) by 434 days.

(21) Appl. No.: 12/594,372

(22) PCT Filed: Apr. 6, 2007

(86) PCT No.: PCT/IB2007/051252
§ 371 (c)(1),
(2), (4) Date: Oct. 2, 2009

(87) PCT Pub. No.: WO2008/122841
PCT Pub. Date: Oct. 16, 2008

(65) Prior Publication Data
US 2010/0118829 A1    May 13, 2010

(51) Int. Cl.
*H04W 4/00* (2009.01)
(52) U.S. Cl. ........................ 370/343; 370/476
(58) Field of Classification Search .................. 370/330, 370/474; 700/213
See application file for complete search history.

(56) References Cited
FOREIGN PATENT DOCUMENTS
WO    2006/052235 A    5/2006

OTHER PUBLICATIONS

Ben-Shimol Y et al: "Two-Dimensional Mapping for Wireless OFDMA Systems" IEEE Transactions on Broadcasting, IEEE Service Center, Piscataway, NJ, vol. 52, No. 3, Sep. 2006, pp. 388-396.
Lodi A et al: "Two-Dimensional Packing Problems: A Survey" European Journal of Operational Research, Amsterdam, NL, vol. 141, No. 2, Sep. 1, 2002, pp. 241-252.
Krishna Balachandran et al: "Design and Analysis of an IEEE 802.16E-Based OFDMA Communication System" Bell Labs Technology, Bell Laboratories, Murrey Hill, NJ, vol. 11, No. 4, Mar. 9, 2007, pp. 53-73.

(Continued)

*Primary Examiner* — Kevin C Harper
*Assistant Examiner* — Henry Baron

(57) ABSTRACT

A method of packing a Worldwide Interoperability for Microwave Access (WiMAX) frame, characterised in that the method comprises the steps of: creating a matrix of substantially the same number of rows and columns as the WiMAX frame; mapping a first control message to a position in a first corner of the matrix; mapping a first data message to a position in a second corner of the matrix, wherein the second corner is opposite in a predetermined direction to the first corner; mapping a plurality of further control messages to the matrix in a first direction moving from the first corner towards the centre of the matrix; and mapping a plurality of further data messages to the matrix in a second direction that is different from the first direction, from the second corner of the matrix towards the centre of the matrix; until one or more of the further data messages meets one or more of the further control messages; copying the control messages from the matrix to a first area of the WiMAX frame; arranging the control messages in the WiMAX frame so that the first control message is located at the start of the frame; and copying the data messages from the matrix to a second area of the WiMAX frame, so that the first data message is located directly after the control messages.

20 Claims, 19 Drawing Sheets

OTHER PUBLICATIONS

IEEE Std 802.16e - 2005: "Part 16: Air Interface for Fixed and Mobile Broadband Wireless Access System, Amendment 2: Physical and Medium Access Control Layers for Combined Fixed and Mobile Operation in Licensed Bands and Corrigendum 1" Sponsor: LAN/MAN Standards Committee of the IEEE Computer Society and the IEEE Microwave Theory and Techniques Society. IEEE Std 802.16e2005—Approved Dec. 7, 2005 and IEEE Std.

WiMAX Forum, "WiMAX Forum Mobil System Profile" Jul. 2006. pp. 1-91.

International Search Report and Written Opinion correlating to PCT/IB2007/051252 dated Jan. 29, 2008.

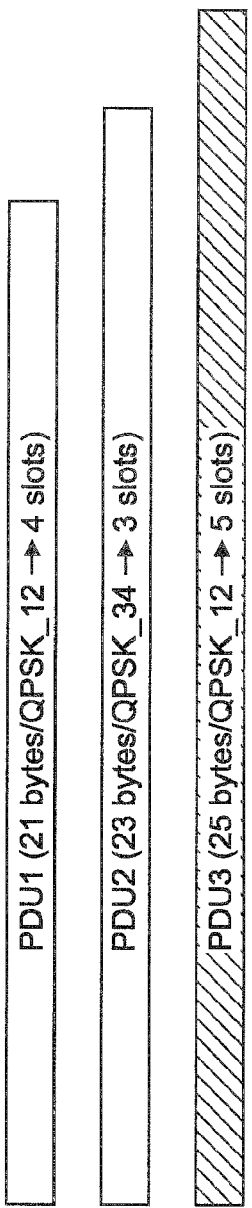
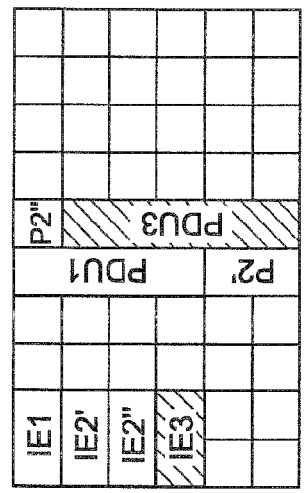
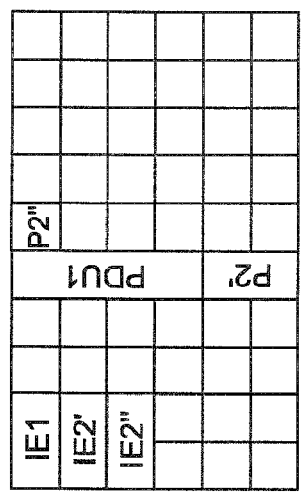
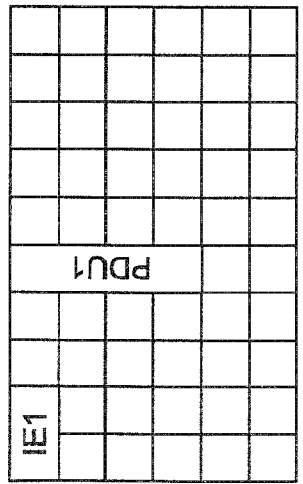
Fig. 8a
Fig. 8b
Fig. 8c

METHOD, DATA STRUCTURE AND COMPUTER SYSTEM FOR PACKING A WORLDWIDE INTEROPERABILITY FOR MICROWAVE ACCESS (WIMAX) FRAME

FIELD OF THE INVENTION

This invention relates to a method, data structure and computer system for packing a Worldwide Interoperability for Microwave Access (WiMAX) frame.

BACKGROUND OF THE INVENTION

Referring to FIG. 1, a typical wireless telecommunications system divides a geographical area into a plurality of cells 10 each of which comprises one or more base stations (Node B), wherein mobile user devices ($UE_1$, $UE_2$, $UE_3$) located within a cell 10 communicate with the base station (Node B) of that cell 10. More specifically, a base station (Node B) handles radio transmissions and reception to and from mobile user devices ($UE_1$, $UE_2$, $UE_3$) over radio channels ($R_1$, $R_2$, $R_3$), and is controlled by a radio network controller (RNC) that is connected to a core network (20). A transmission from a base station (Node B) to a mobile user device ($UE_1$, $UE_2$, $UE_3$) is known as a downlink transmission. Similarly, a transmission from a mobile user device ($UE_1$, $UE_2$, $UE_3$) to a base station (Node B) is known as an uplink transmission.

The Worldwide Interoperability for Microwave Access (WiMAX) protocol (IEEE 802.16 standard) is a wireless communication protocol, which employs Orthogonal Frequency Division Multiple Access (OFDMA) in combination with Time Division Multiple Access (TDMA). Orthogonal Frequency Division Multiplexing (OFDM) subdivides a high data rate input data stream into a number of parallel sub-streams of reduced data rate wherein each sub-stream is modulated and simultaneously transmitted on a separate orthogonal sub-carrier. In Orthogonal Frequency Division Multiple Access (OFDMA) sub-carriers are grouped into sub-channels, wherein in order to mitigate the effects of frequency selective fading, the carriers in a given sub-channel are spread along channel spectrum. In the hybrid OFDMA/TDMA approach, transmission channels are divided in the frequency domain into a plurality of sub-carriers and are divided in the time domain into time slots of fixed or variable duration. In other words, each time slot contains a data segment (of OFDM symbols) of fixed or variable size (whose size depends on the chosen modulation/coding method of the transmission channel), wherein these data segments (or slots) represent the smallest accessible portion of the network resources provided by the OFDMA/TDMA approach, which are managed by a MAC protocol.

Thus, referring to FIG. 2, a WiMAX frame can be modelled as a matrix $M \in \mathfrak{R}^{m \times n}$ with m (sub-channel) rows and n (symbol) columns, wherein an individual element of the matrix M is a slot s(i, j), i=0 . . . m−1, and j=0 . . . n−1, wherein the WiMAX physical layer provides m and n as part of the characteristics of the frame matrix. In practice, rather than each cell containing a waveform, the cells contain coefficients representing the waveforms, wherein the coefficients are derived from a Fast Fourier Transform (FFT). The number of bits encoded by a given wave form depends on the modulation coding scheme (MCS) employed by each waveform.

SUMMARY OF THE INVENTION

The present invention provides a method, data structure and computer system for packing packing a Worldwide Interoperability for Microwave Access (WiMAX) frame as described in the accompanying claims.

BRIEF DESCRIPTION OF THE DRAWINGS

Several embodiments of the invention will herein be described by way of example only, with reference to the accompanying drawings in which:

FIG. 8 is a block diagram of a prior art sequential laying mapping approach to packing the WiMAX frame shown in FIG. 3;

DETAILED DESCRIPTION OF THE PREFERRED EMBODIMENTS

1. Overview of Potential Frame Packing Problem

The WiMAX MAC protocol is designed to handle the requirements of point-to-multipoint network environments wherein a central base station handles multiple simultaneous transmission requests (since the air interface is shared among UEs that wish to transmit to the base station). Uplink communications are conducted in accordance with TDMA, wherein the base station allocates variable numbers of time slots to a given UE in accordance with its bandwidth requirements.

Figure 1:
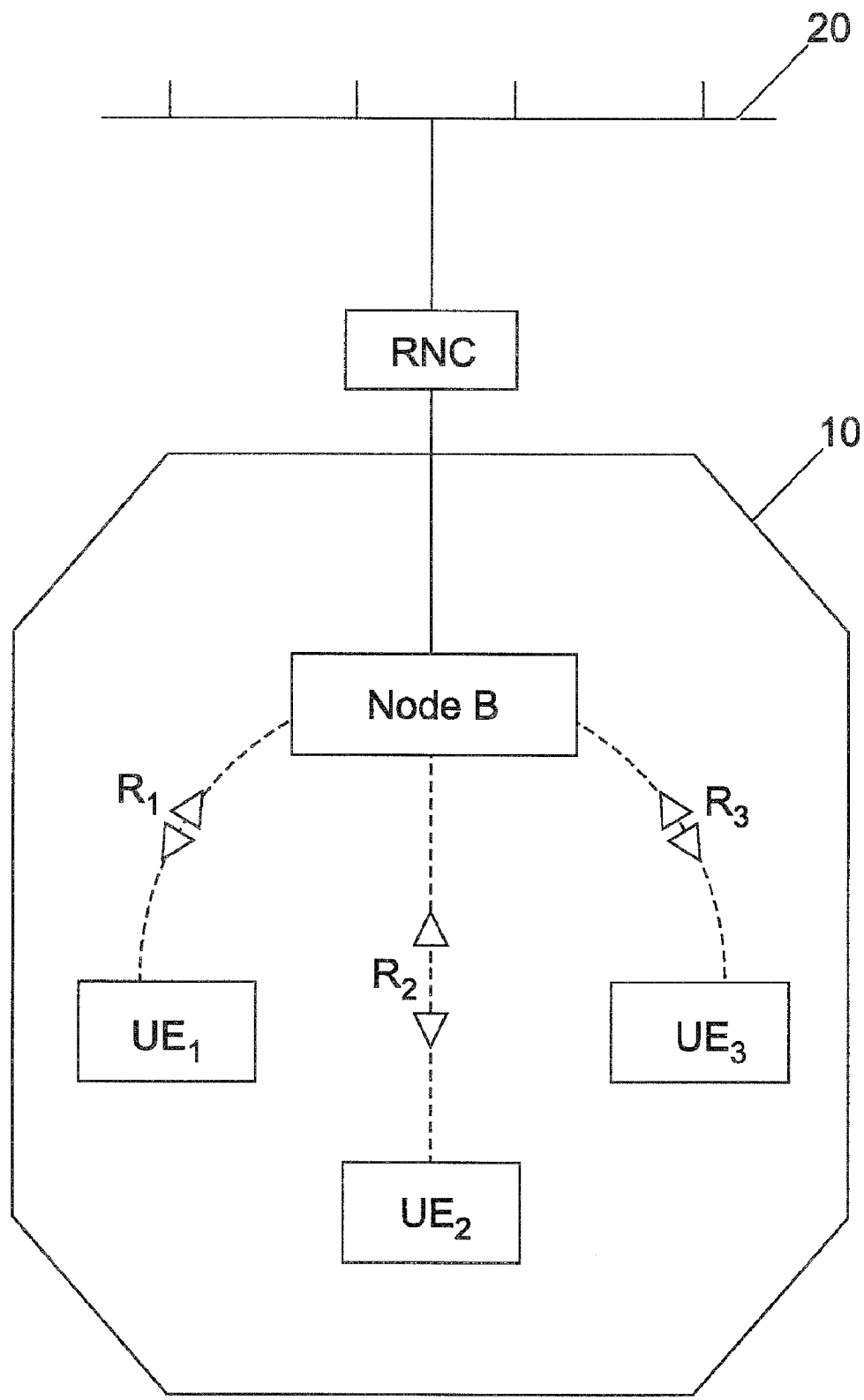
FIG. 1 is a block diagram of a typical prior art wireless telecommunication system.
Figure 2:
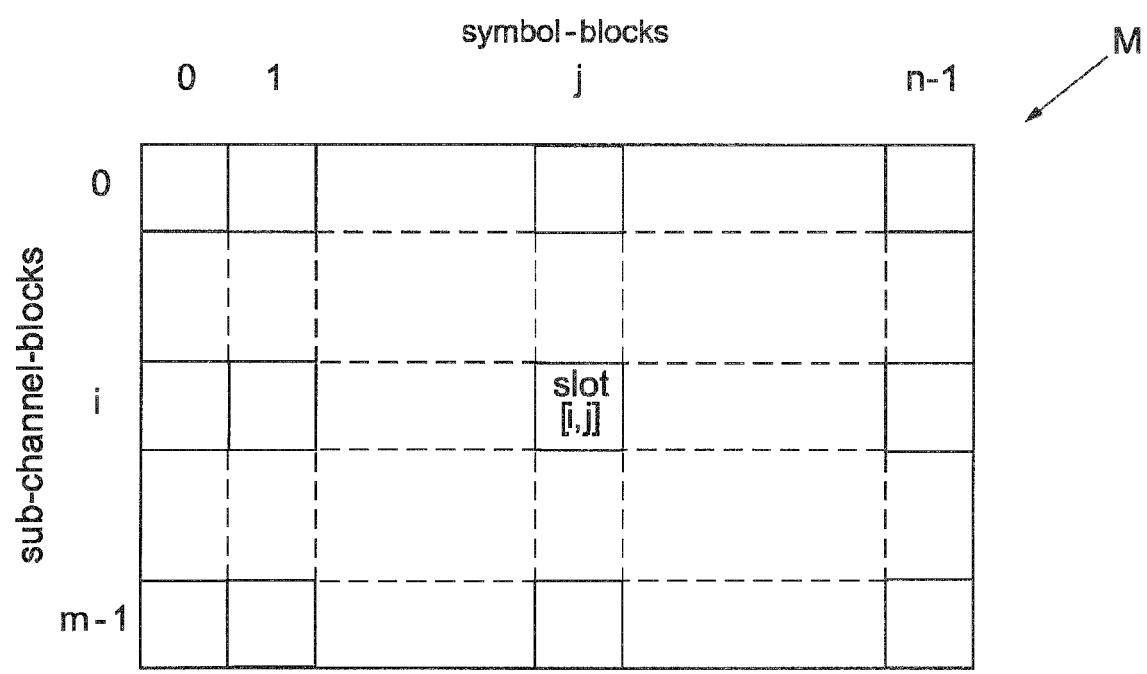
FIG. 2 is a block diagram of a typical prior art OFDMA/TDMA frame.
Figure 3:
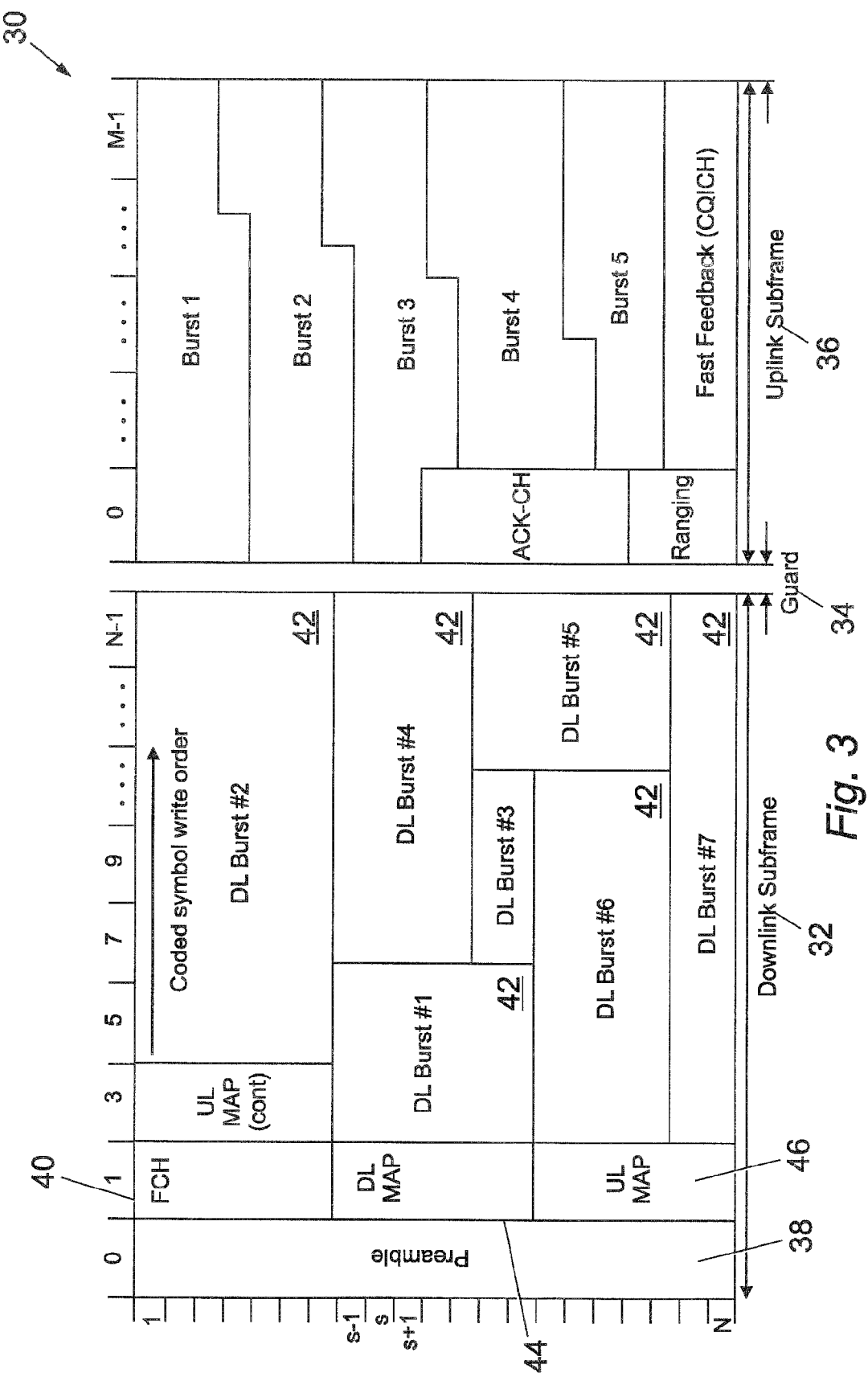
FIG. 3 is a block diagram of a typical prior art WiMAX frame.

WiMAX employs two duplexing schemes, namely Time Division Duplexing (TDD) and Frequency Division Duplexing (FDD), to accommodate the demands of the different types of traffic transmitted on a WiMAX network (e.g. voice traffic and Internet Protocol (IP) data). In TDD, a base station periodically transmits frames to the UEs. Referring to FIG. 3, it can be seen that a WiMAX frame 30 is essentially an extension on the OFDMA/TDMA frame shown in FIG. 2. In particular, a WiMAX frame comprises downlink subframe 32 (comprising slots used for downlink traffic) followed by a guard 34 to prevent downlink and uplink transmission collisions. The guard 34 is followed by a uplink subframe 36 (comprising slots for uplink traffic).

The downlink subframe 32 is made up of a preamble 38 and a Frame Control Header (FCH) 40. The FCH 40 specifies the burst profile and the length of one or more DL bursts 42 that immediately follow the FCH 40. Following the FCH 40, the downlink subframe 32 comprises a DL-MAP 44 and a UL-MAP 46. The DL-MAP 44 and UL-MAP 46 provide sub-channel allocation and other control information for the DL and UL sub-frames 32, 36 respectively (e.g. the uplink time slots allocated to a given UE by the base station). The DL-MAP 44 and UL-MAP 46 also specify the UE's that are receiving and/or transmitting in each burst; and the coding and modulation used in each burst and in each subchannel. The uplink subframe 36 contains a contention interval for ranging and bandwidth allocation purposes and data bursts from different UE's.

Each data burst consists of an integer number of OFDM symbols and is assigned a burst profile that specifies the code algorithm, code rate, and modulation level that are used for those data transmitted within the burst. More particularly, each burst comprises a plurality of MAC layer protocol data units (PDUs). A PDU comprises a fixed length header, a variable length payload and an optional field for cyclic redundancy check (CRC). There are two types of MAC headers, namely a generic header (which is used to transmit data or MAC messages) and a bandwidth request header (which is used by a UE) to request more uplink bandwidth.

In summary, a service data unit (SDU) is an entity (e.g. IP packet) that arrives at the MAC level from an upper level (e.g. network layer) of the WiMAX network model. An SDU must be encapsulated in a PDU before it can be transmitted to, or from, a UE. A PDU is in turn transmitted within a data burst, wherein a data burst comprises one or more slots in a WiMAX frame.

Figure 4:
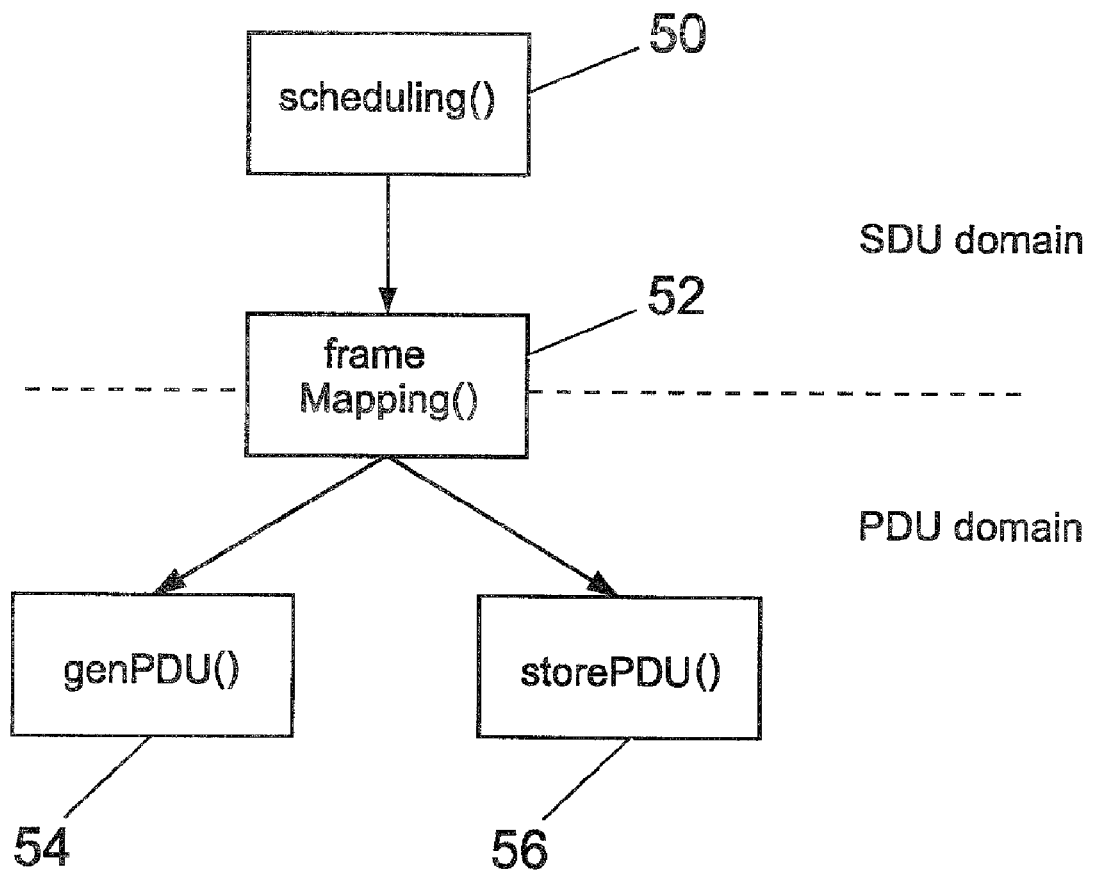
FIG. 4 is a block diagram of a typical prior art scheduler and frame mapper operating on a typical prior art WiMAX protocol data unit.

Referring to FIG. 4, a PDU encapsulates a service data unit (SDU) from a flow chosen by a scheduler 50. Conceptually, a scheduler 50 decides which flow should be served and how many bytes the flow should be scheduled out firstly. The bytes from the flow constitute the SDU to be transported. Then, a frame mapping procedure (i.e. a frame mapper 52) takes the SDU, generates 54 an encapsulating PDU, and stores 56 the PDU to a burst to enable the physical layer to transport the PDU with a predefined modulation/coding method.

The number of bytes in a burst is related to the modulation/coding method associated with the chosen flow. Thus, the capacity of a burst may vary greatly from burst to burst. Thus, take for example, a first burst of 8 slots comprising a PDU derived from a QAM64__34 flow, and a second burst of 12 slots comprising a PDU derived from a QPSK__12 flow. In this case, the first burst 1 contains 27×8=216 bytes whereas the second burst contains 6×12=72 bytes.

The interface between the frame mapper 52 and the scheduler 50 is a set of parameters comprising a flow number (or queue ID identifying the flow) chosen by the scheduler 50, the number of SDU bytes desired to be transported, and/or the number of SDU bytes allowed to be transported as an upper limitation. On receipt of these parameters from the scheduler 50, the frame mapper 52 tries its best to fulfil the request and reports how many bytes are really transported. During the mapping procedure, one or more bursts may be generated for a chosen flow's SDU, wherein each of the bursts carries a PDU generated by a PDU generation procedure.

This procedure can be summarised as follows:
1. the scheduler 50 chooses a flow (e.g. flow$_A$) and decides the number of SDU bytes (e.g. $r_A$ bytes) to be transported to meet the flow's quality of service (QoS) requirements;
2. the scheduler 50 requests the frame mapper 52 to transmit the $r_A$ bytes for flow$_A$ and allows the frame mapper 52 to transport up to $u_{LIM}$ bytes if there is enough bandwidth available;
3. the frame mapper 52 examines the available bandwidth, space of the frame, and tries its best to fulfil the scheduler's request;
4. during the mapping, one or more bursts may be generated depending on the available bandwidth, space in the frame, and fragmentation/segmentation requirements;
5. a PDU generation procedure 54 is called by the frame mapper 52 to associate the SDU with its PDU(s); and
6. a PDU storing procedure 56 is called by the frame mapper 52 to store the PDU burst(s) associated with the SDU in a WiMAX frame.

To enable the bursts to be decoded by a recipient, each burst must be associated with a small descriptive overhead at the beginning of its WiMAX frame. The descriptive overhead (or information element IE) provides decoding/demodulation information for its corresponding burst and the start co-ordinates for the burst in the WiMAX frame. The following constraints have a critical impact on the design of a frame mapper 52:

(a) the IE for a first burst must be located in the top left hand corner of the WiMAX matrix just behind the FCH, and subsequent IEs successively located in a top-down fashion thereafter to constitute a DL_MAP area, whereas the bursts associated with the IEs can be located in any space available in the WiMAX matrix;

(b) the first burst (henceforth known as the uplink control) carries the Uplink Map and it must be located directly after the DL_MAP area; and (c) if a PDU has to be fragmented into two bursts, the first burst must be located before the second burst in terms of time (e.g. if the first burst is located in column n of the WiMAX matrix, the second burst must be located in any column m, wherein m>n).

Figure 5:
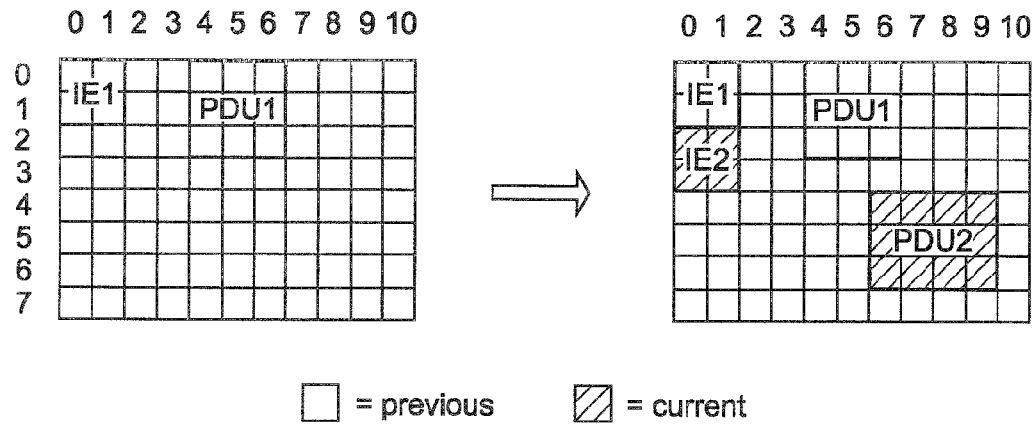
FIG. 5 is a block diagram of a typical prior art rough mapping of protocol data units (PDUs) in the WiMAX frame shown in FIG. 3.

For simplicity, the DL_MAP area will be known henceforth as the control area. The FCH is omitted in the discussion since it occupies a pre-specified constant area in the WiMAX frame. Thus, an uplink or downlink sub-frame is effectively divided into a control area and a data area, wherein the control area houses the IEs (or descriptive overheads) and the data area houses the bursts associated with the IEs. The size of a burst overhead (IE) is small but it may differ from one IE to another. Similarly, the size of a burst depends on the size of its corresponding PDU. Referring to FIG. 5, if the Uplink Map burst (PDU1) comprises 9 slots and is derived from a QAM64_34 flow, then burst PDU1 occupies 9×27=243 bytes. Similarly, if a second burst PDU2 comprises 12 slots and is derived from a QPSK_12 flow, then burst PDU2 occupies 12×6=72 bytes.

Figure 6:
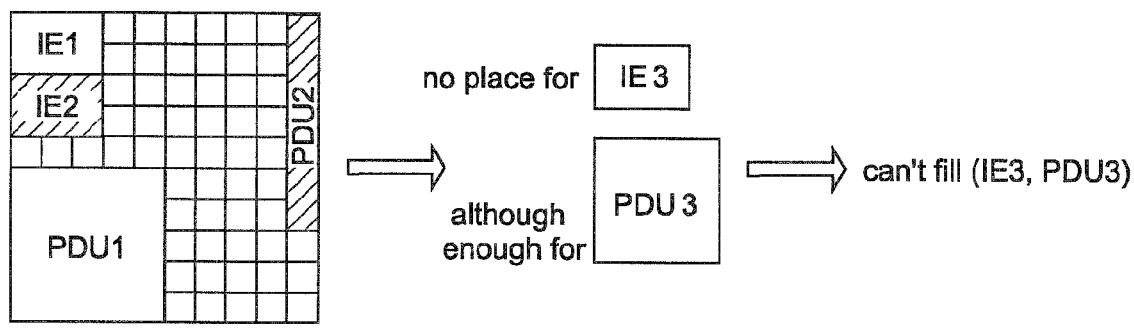
FIG. 6 is a block diagram of a prior art incorrect mapping of PDUs in the WiMAX frame shown in FIG. 3.
Figure 7:
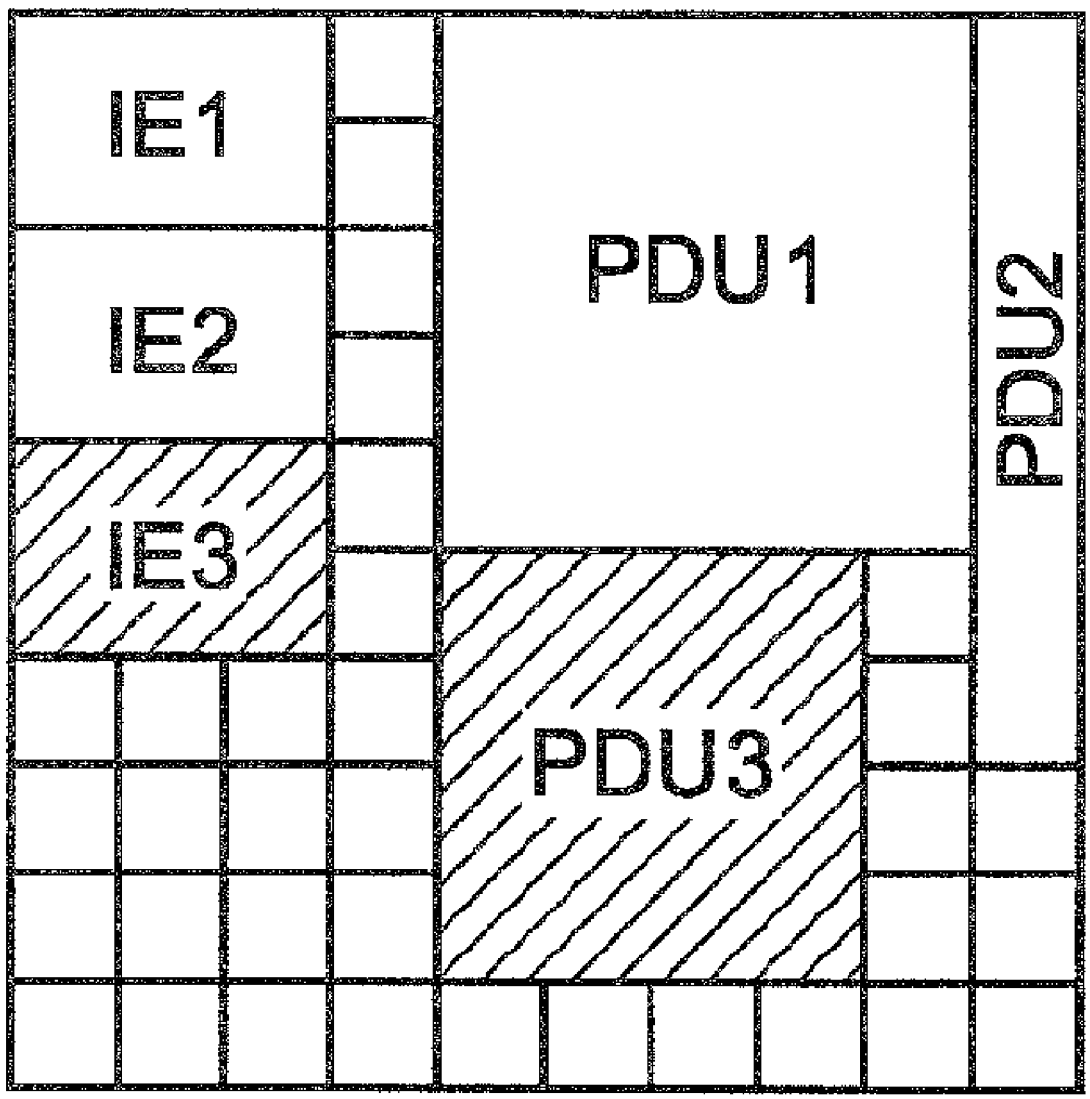
FIG. 7 is a block diagram of a prior art correct mapping of PDUs in the WiMAX frame shown in FIG. 3.

To use a WiMAX frame efficiently, a mapper must keep the data area away from the control area. Otherwise, it may not be possible to map any further bursts in a WiMAX frame, even though there is enough bandwidth in the frame. For example, if a burst is mapped in the control area, as shown in FIG. 6, then no more PDUs can be mapped to the frame, although there are a lot of empty slots (available bandwidth) in the frame. A more sensible way of filling a WiMAX frame is shown in FIG. 7 wherein PDU2 is placed in the frame at a position which leaves room for PDU3's IE and burst. This arrangement also makes it possible to place more PDUs in the frame. It will be recalled that IE's may have slightly different sizes. In the above figures, the IEs are depicted as having an "average" size for simplicity.

The goal of WiMAX frame mapping can be summarised as follows:
1. making best use of the available air bandwidth since this is the most precious resource in a wireless system;
2. completing the frame mapping process in a given time period; and
3. achieving a certain level of analysis, to obtain a performance profile of the procedure.

Thus, the WiMAX frame mapping process can be considered as a constrained optimisation problem. The constraints arise because until a frame has been filled, it is not possible to know where the control area of the frame ends (and the data area begins). Nonetheless, it is still necessary to locate the uplink control directly after the control area and then try to slot the rest of the bursts into the remaining space.

At first glance, the WiMAX frame mapping problem can be considered as a one-dimensional or two dimensional "bin-packing" problem, (M. Garey and D. Johnson, "Computers and Intractability: A Guide to the Theory of NP-Completeness", W. H. Freeman & Company, 1979; A. Lodi, S. Martello, M Monaci, Eur. J. Oper. Res., 141 (2002) 241-252). However, a significant difference exists between the traditional bin-packing problem and WiMAX frame mapping. In the bin-packing problem a given item cannot be broken into small pieces, whereas in WiMAX frame mapping, a packet may be segmented into small pieces. Despite these differences, a bin-packing analogy can be used to analyze various approaches to WiMAX frame mapping. Using this analogy, a bin (or partition) can be defined as one or more consecutive columns of a WiMAX frame wherein the mapping process packs the bins in the frame. In view of the possibility of packet segmentation, three WiMAX frame mapping methods have been identified.

(a) Sequential Laying

Referring to FIG. 8, the sequential laying process is a straightforward method which maps the control area with IEs in a top-down fashion and fills the data area in a similar fashion with PDU bursts (PDUs). This process is carried out under the assumption that the position of the uplink control (PDU1) has already been established. If a PDU exceeds the available space in a bin, the PDU is segmented and the excess portion of the PDU is mapped into a new bin. In the example shown in FIG. 8(*a*), once PDU1 has been mapped to a first bin, PDU2 is too large to fit in the remaining space in the bin. Thus, referring to FIG. 8(*b*), PDU2 is segmented into P2' and P2"; and two corresponding IEs (namely IE2' and IE2") are provided for the segments. The first segment of PDU2 (i.e. P2') is mapped to the remaining space of the first bin and the second segment of PDU2 (i.e, P2") is mapped to the next bin. The two corresponding IEs (namely IE2' and IE2") are positioned following IE1 in the control area. Referring to FIG. 8(*c*), the next PDU (namely PDU3) is then fit into the remaining space of the second bin (if possible).

The sequential laying approach has the advantage that is that it is easy to manage the control area and the data area. In addition, from a bandwidth-efficiency point of view, at worst (e.g. where every PDU is one byte greater than the available bin), a PDU may waste one row in a bin and create an extra IE for a very small (one byte) burst.

Nonetheless, one concern with the sequential laying approach is that it may cause too many segmentation operations. A simple case by case examination does not give a whole picture of a stochastic process, since arriving packets have different lengths and the size of a bin may also change from one frame to another. Thus, one way to analyse the stochastic process is to "average" everything to an expected value. In particular, let each bin have B slots on the average and let each packet occupy P slots on the average. In practice, $P \leq B$. Thus, the first bin in the data area can hold $$\left\lfloor \frac{B}{P} \right\rfloor$$

non-segmented packets, and there are (B mod P) unmapped slots remaining on the average. If B is divisible by P, no segmentation is needed. At worst, P and B are co-prime. In this case, each of $$\left(\left\lfloor \frac{B}{P} \right\rfloor + 1\right) \approx \left\lfloor \frac{B}{P} \right\rfloor$$

packets require a segmentation operation. It is known that for two random integers the chance that they are co-prime is $$\frac{6}{\pi^2} \approx 61\%.$$

By considering the fact that gcd(B,P)≠1 for some B's and P's, the probability that P and B are co-prime is less than $$\frac{6}{\pi^2}.$$

As a result, at worst, the chance of a packet being segmented is around P/B and this worst-case scenario happens in about 61 out of a hundred cases. In other words, if packets are small while a bin is large, the rate of segmentation is very low.

(b) Sequential Laying with Last Bin Check

Figure 9C:
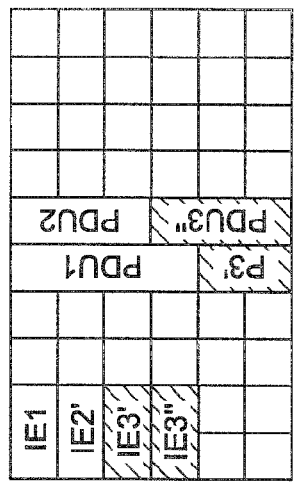
FIG. 9 is a block diagram of a prior art sequential laying with last bin check mapping approach to packing the WiMAX frame shown in FIG. 3.
Figure 9B:
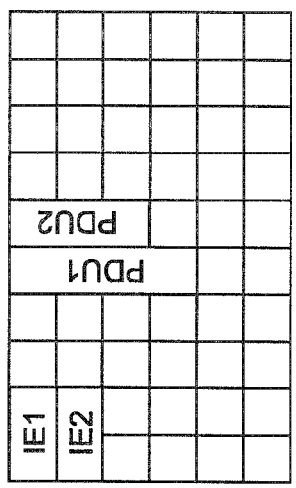
Figure 9A:
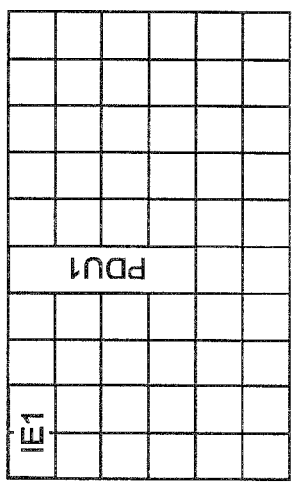

The sequential laying with last bin check approach first attempts the previous sequential laying approach. However, if a PDU exceeds the available space in a bin, instead of segmenting the PDU, the sequential laying with last bin check approach tries to place the PDU in its entirety in a new bin. Referring to FIG. 9 and using the same example as used in FIG. 8, instead of segmenting PDU2, the sequential laying with last bin check approach fills PDU2 in BIN2 straightaway (FIG. 9(b)). The sequential laying with last bin check approach then segments the next PDU (i.e. PDU3) into P3' and P3". The sequential laying with last bin check approach also generates two IEs (namely IE3' and IE3") corresponding to the segments of PDU3, and locates the two IEs in the control area of the frame. The sequential laying with last bin check approach then fills the empty space of BIN2 and BIN3 with the segments P3' and P3". Because the empty space is large enough to accommodate the two segments, no new bin is created for PDU3.

If the same assumption is applied to the sequential laying with last bin check approach as was used for the previously described sequential laying approach, then the first bin's empty space comprises approximately (½)×P slots. On the average, a segmentation operation happens after $$2 \times \left\lfloor \frac{B}{P} \right\rfloor$$

packets and it maps a PDU into the empty space of two existing bins. Thus, the average number of segmentation operations required by the sequential laying with last bin check approach seems better than that of sequential laying approach. However, it should be noted that the figure of one segmentation per $$\left\lfloor \frac{B}{P} \right\rfloor$$

packets for sequential laying represents a worst-case scenario, which happens with 60% probability.

(c) Sequential Laying without Segmentation

The sequential laying without segmentation approach comprises the steps of:
 finding an available bin and putting the selected PDU into the bin;
 finding the bin with maximum available space in the event that no bin has enough space for the PDU; and
  filling part of the PDU into the bin.

Whilst the sequential laying without segmentation approach avoids the problem of segmentation, nonetheless, it creates some new issues. In particular, it is necessary to decide whether to create a new bin. Similarly, it may cause too few data to be transported. In addition, it causes unnecessary segmentation operations at the lower level. Finally, it is necessary to maintain bin order so as to pick the largest or most suitable bin. This issues make the algorithm unnecessarily complicated.

(d) Sequential Laying with Controlled Segmentation

The sequential laying with controlled segmentation approach comprises the steps of:
 placing PDU's sequentially in a frame;
 examining the size of the trailing part of a fragmented PDU (e.g. PDU2" in FIG. 8) when segmentation happens;
 generating a new IE in the event that the trailing part is too big; or
 mapping only the leading part of the PDU to the frame.

2. Overview of the Method of Packing a WiMAX Frame

All of the algorithms and procedures of the embodiments described herebelow are implemented in a base station in communication with at least one wireless user devices. In particular, the procedures are implementable in a processing circuit module in a base station, wherein the processing circuit module effectively processes WiMAX frames independently of the data rate of data arriving at the module.

The original sequential laying approach is a viable starting point for the packing method of the first embodiment, since at least part of it will be re-used by other approaches. In particular, from an implementation point of view, the sequential laying approach can be used as a baseline for other more advanced approaches followed by sequential laying with controlled segmentation.

The first possibility is to employ a floating hill search type of approach wherein an empty matrix is populated by first predefining a control area and a data area in a frame and progressively populating the control area and data area with PDUs. Once the available control area is filled, the control area is increased (by effectively moving forward a dividing line between the control area and the data area in the frame and moving the PDU bursts in the data area accordingly). However, this approach requires constant monitoring of the control area and the data area to ensure that the control area does not overflow.

A further problem exists because as will be recalled the uplink control (i.e. the first PDU burst) must be located directly after the control area. However, it is extremely difficult to determine the location of the uplink control in a frame before determining how the other bursts are mapped to the data area. A trivial way of overcoming this problem is to predefine a location for uplink control. However, this may cause the data area of a frame to be full while there is spare bandwidth in the control area, or vice verse. To utilise the unused bandwidth either in the control area or in the data area, an ad-hoc way of moving bursts is needed. However, without a strict model of the frame mapping, many other issues (e.g. bandwidth efficiency, algorithm complexity, completeness, and robustness, and scalability) become problematic.

Figure 10:
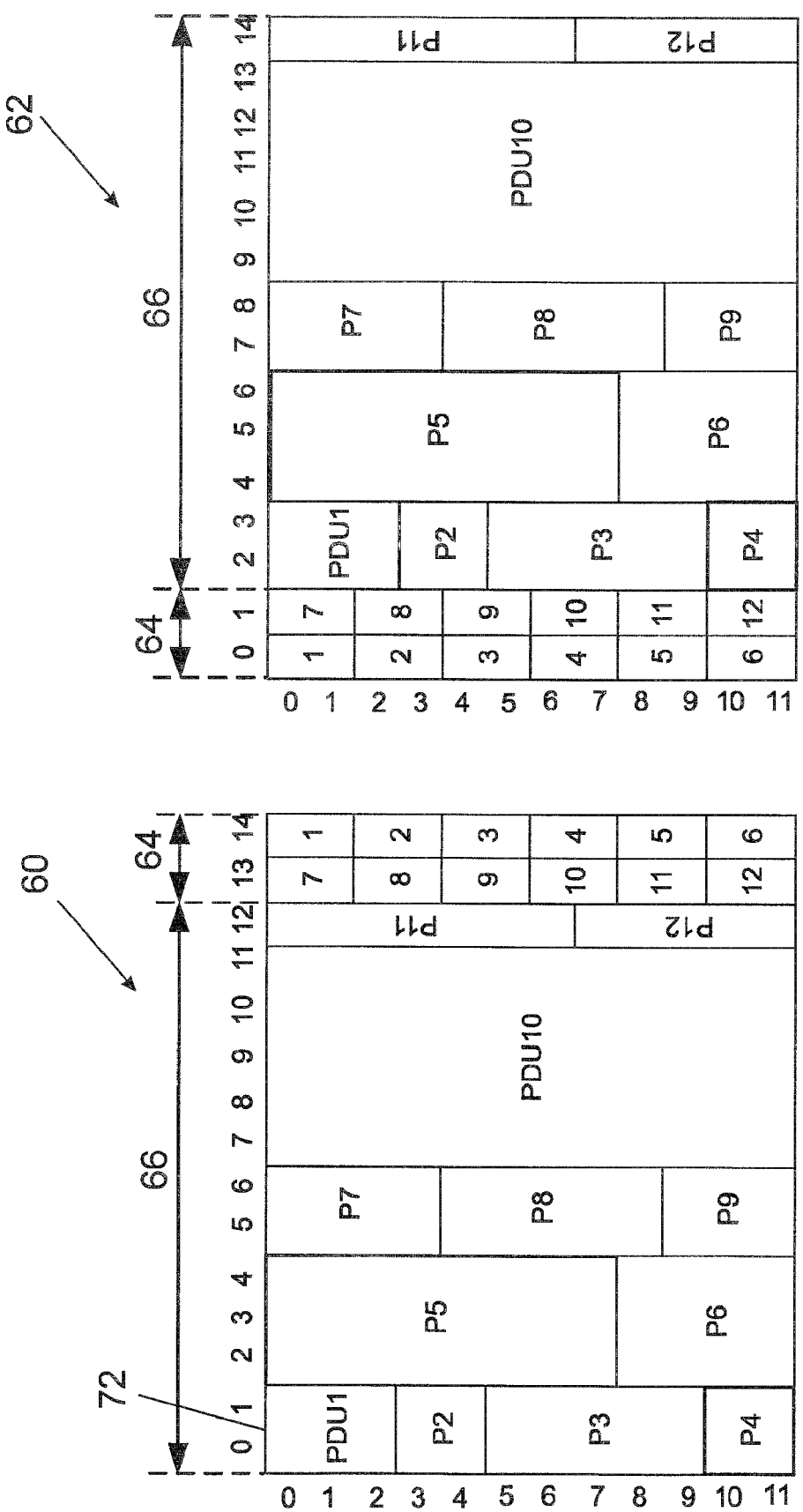
FIG. 10 is a block diagram showing a mapping between a real WiMAX frame and a virtual frame in accordance with an embodiment of the invention, given by way of example.

Referring to FIG. 10, the frame mapping method of the preferred embodiment overcomes this problem by providing a virtual or imaginary frame 60, which has the same number of rows and columns as a real WiMAX frame 62. The virtual frame 60 is divided into an control area 64 and a data area 66 with the control area 64 being located on the far right of the virtual frame 60 and the data area 66 located on the far left of the virtual frame 60. Thus, instead of mapping IEs from the top-left corner of a real WiMAX frame 62 and downwards to the right of the frame 62 as discussed above (and mapping bursts downwards and to the right of the real WiMAX frame 62), the first IE is mapped to the top-right corner 70 of the virtual frame 60 and the IEs populate the control area 64 in a downwards fashion which leads to the control area 64 progressively expanding in a leftward direction into the available virtual frame 60 body. Similarly, the PDU bursts populate the data area 66 so that the PDU burst is placed in the most far left cell 72 within the virtual frame 60 and the data area 66 effectively expands rightwards within the virtual frame 60 core. Thus, in effect, the control area 64 and the data area 66 expand into the virtual frame 60, so that the division between the control area 64 and the data area 66 is not firmly established from the outset.

At some point, the control area 64 and the data area 66 will have effectively expanded enough to meet each other within the virtual frame 60. In this case the virtual frame 60 is full. Once the virtual frame 60 is full, a real WiMAX frame 62 is generated from the virtual frame 60, by moving the data area 66 of the virtual matrix 60 to the far right of the real WiMAX frame 62 and moving the control area 64 of the virtual frame 60 to the far left of the real WiMAX frame 62 and flipping the sequence of IEs within the control area 64 so that the first IE is located at the most far left position within the real WiMAX frame 62. Thus, with, for example, a burst P1 with coordinates (0,0) and a control area 64 comprising L columns, the translation process moves the P1 burst to the coordinates (0+L,0).

The use of a virtual frame 60 provides a "meet-in-the-middle" approach to utilise air bandwidth. If a solution is found in the virtual frame 60, the solution can be applied to the real WiMAX frame 62 straightaway. With this virtual frame 60 it is no longer necessary to constantly monitor the state of the control area 64 and the data area 66 of a WiMAX frame 62. Instead it is only necessary to determine when the control area 64 and the data area 66 meet within the virtual frame 60.

This mechanism utilises WiMAX frame efficiently, so that in practice, on the average, less than 1% of a frame's slots are left empty in most cases. These empty slots can be used by further optimisation procedures. The method is analysable for bandwidth efficiency and algorithm complexity. Furthermore, the method is scalable.

3. Data Structure Used in the Method of Packing a WiMAX Frame

Figure 11:
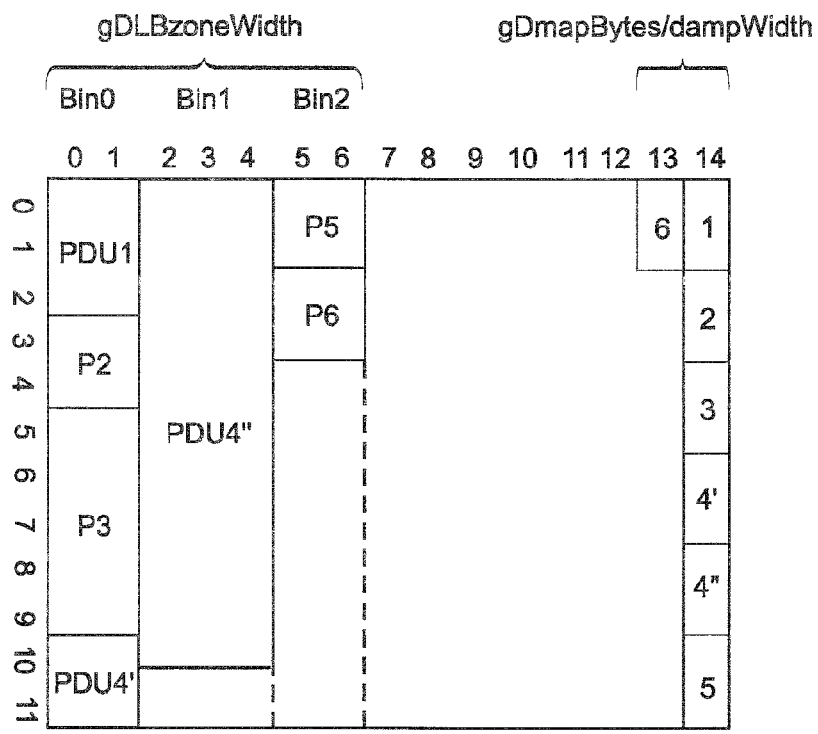
FIG. 11 is a block diagram of a data structure in accordance with an embodiment of the invention, given by way of example, employed in the mapping depicted in FIG. 10.
Figure 11:
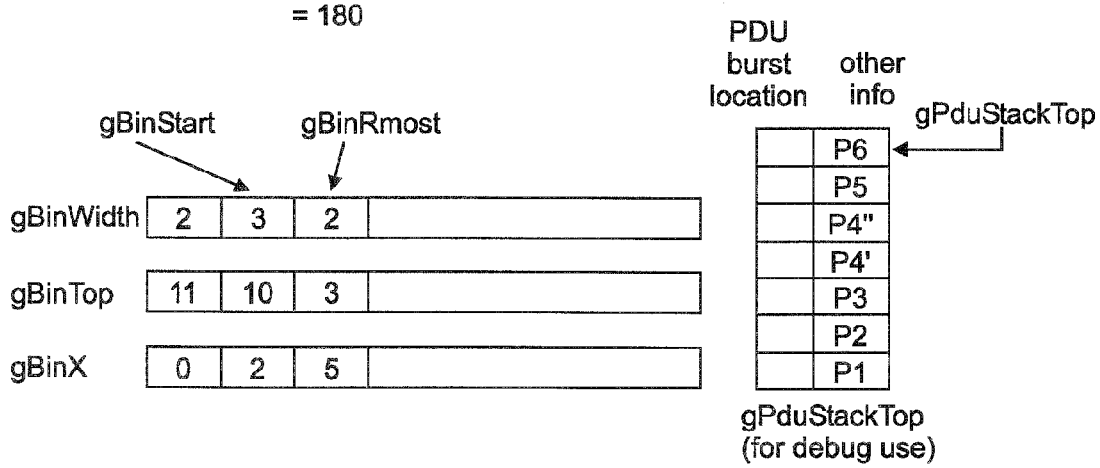

Since the above algorithm has been implemented within the WiMAX MAC layer, the WiMAX frame resulting therefrom will not be properly populated until physical information is provided by the WiMAX physical layer. Thus, the generation of the virtual frame 60 does not increase the memory demands of either the base station or any of its recipient mobile phones, since neither the real WiMAX frame 62 nor its virtual counterpart is a physical entity yet. Furthermore, a vector of available coordinates is needed rather than a specific matrix to represent the real WiMAX 62 and virtual frames 60. Furthermore, a debugging stack is useful for monitoring the status of the control area 64 and data area 66 in a virtual frame 60. In view of these considerations, a data structure was designed as shown in FIG. 11. The data structure comprises the following components:

(a) gBWa—A global variable which indicates the number of slots available in the virtual frame 60, wherein this variable is initialised by the WiMAX physical layer;
(b) gDLBzoneWidth—the width in slots of the downlink data area of the virtual frame 60;
(c) gBinStart—the first bin with useful slots in the virtual frame 60;
(d) gBinRmost—the right-most defined/created bin in the virtual frame 60. Beyond this bin, the virtual frame 60 comprises an open area in which new bins can be created;
(e) gBinWidth—provides the width of a given bin in the virtual frame 60 in slots;
(f) gBinTop—provides the Y-ordinate of a bin in the virtual frame 60 (bin=i);
(g) gBinX—provides the X-ordinate of a bin in the virtual frame 60 (bin=i);
(h) gPduStack—is a stack which records all the PDU bursts in the virtual frame 60. Its "PDU burst location" field stores the 4-tuple <x, y, w, d> locating a PDU where x and y specify the top-left corner of a burst while w and d give the width and depth of the burst. Its "other info" field includes a QID and a pointer to the data of the PDU burst; and
(i) gPduStackTop—points to the top of the stack.

Both the gPduStack and gPduStackTop variables are optional, for standalone code debugging.

4. Algorithms Used to Implement the Method of Packing a WiMAX Frame

As previously discussed, a frame mapper takes a service data unit (SDU) (e.g. an IP packet) and encapsulates it within a protocol data unit (PDU). The PDU's are used to populate the data area of the WiMAX frames. A problem arises if an individual PDU burst is too large to fit within an available column of the WiMAX frame. One way of overcoming this problem is to fragment the SDU. Accordingly, two algorithms derived from the bin-packing problem have been developed. Both algorithms are implemented on virtual frames 60. In the first algorithm (known as the FED algorithm or frameMappingSeg( )) a given SDU is mapped into one or more PDU bursts wherein fragmentation of an SDU is performed automatically in the event that it cannot fit within the available space of a column. In the second algorithm (known as FFR or frameMappingSDU( )) an SDU is mapped into a PDU burst without segmentation. This algorithm is mainly used for mapping MNG flows (management flows) and the uplink control. The two algorithms can pack and create variably-size bins and are preceded by an initialisation procedure for the data structure (shown in FIG. 11).

(a) Initialising the Data Structure

The key parameters in the data structure are initialised as flows:

gBWa is initialised as the total available bandwidth in the number of slots of the virtual frame 60 (usually, it is the number of rows in the virtual frame 60 multiplied by the number of columns in the virtual frame 60 minus some reserved slots);
gBinStart is initialised as 0;
gBinRmost is initialised as −1;
gDmapBytes is initialised as FCH_SLOTS*BYTES_PER_SLOT_DLMAP as defined in FIG. 218 of IEEE Std 802.16e™ (2005);
gDLBzoneWidth is initialised as 0; and
gDLBstackTop is initialised as −1 as the stack is empty at the beginning.

(b) FFR Algorithm (frameMappingSDU( ))

Figure 12:
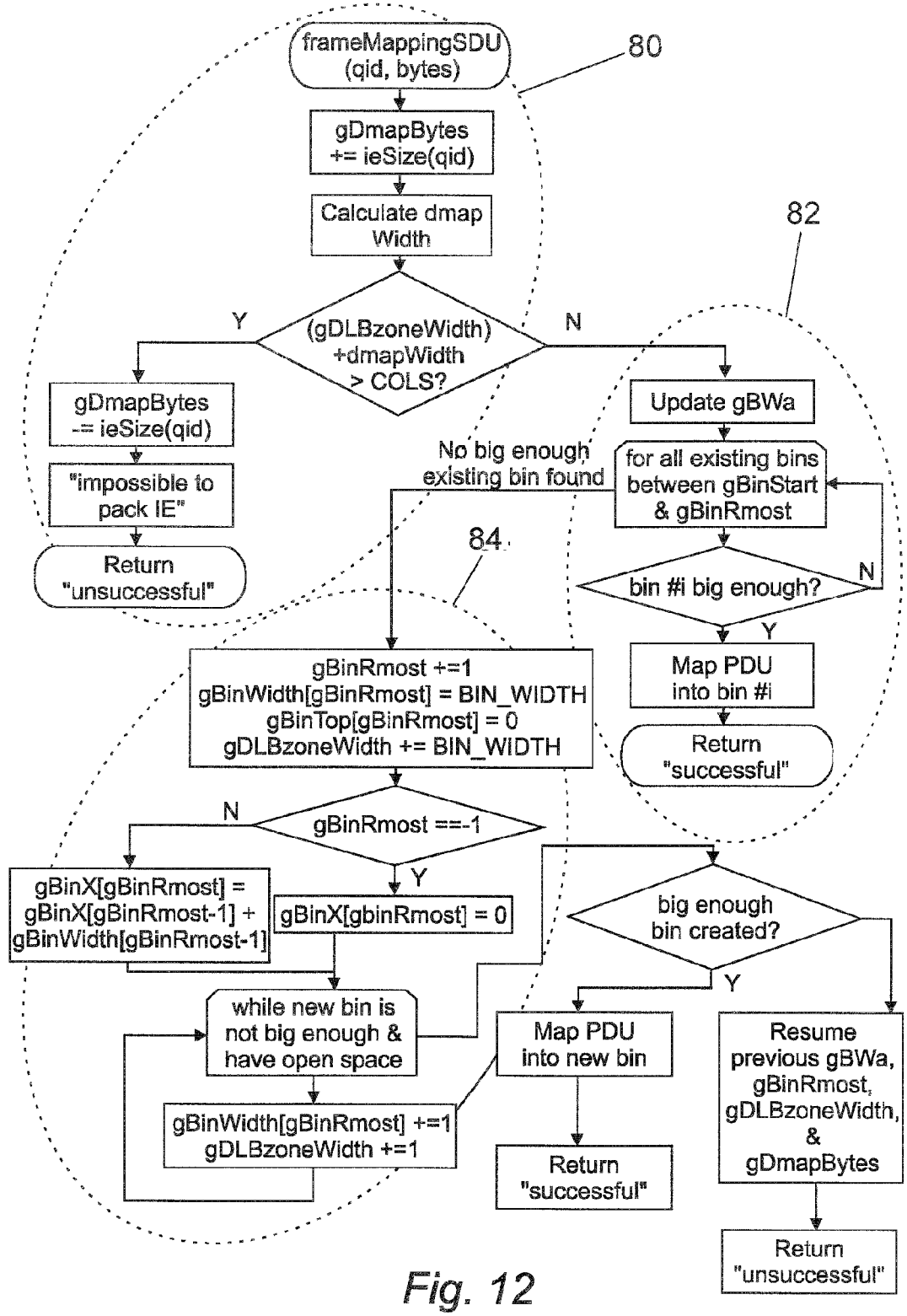
FIG. 12 is a flowchart of a FFR or frameMappingSDU( ) algorithm, in accordance with an embodiment of the invention, given by way of example, which performs the mapping shown in FIG. 10.

Referring to FIG. 12, the FFR algorithm firstly 80 maps an IE into the control area and adjusts gBinStart, then reviews 82 the bins between gBinStart and gBinRmost to determine if there is an existing bin big enough (in the virtual frame 60) to accommodate a given SDU. If a bin with enough space is found, a single PDU burst for the given SDU is profiled. However, if a suitable bin is not found, the FFR algorithm tries to create 84 a new, sufficiently large, bin in the open area of the virtual frame 60. If there is enough bandwidth available, the bin is successfully created and the SDU is mapped thereto. Otherwise, there is not enough space to create a single burst for the given SDU. Thus, the FFR algorithm returns either 0 (for failing to map the SDU) or the SDU length in bytes (on succeeding in mapping the SDU to the virtual frame 60).

Numerical Example of FFR Algorithm

Let a virtual frame be represented as a 12×15 matrix. Further, let a slot contain 3 bytes, and an IE burst on the average comprise 6 bytes. Similarly, let a service flow comprise five packets (PDU1-PDU5) wherein PDU1, PDU2, PDU3, PDU4 and PDU5 are respectively 6, 33, 12, 6 and 14 slots in size. The FFR algorithm creates bins with two slots wide as long as there is enough space in the matrix. Initially, gStart=0, gRmost=−1, gDLBzoneWidth=0, and gDmapBytes=0. gBinWidth[ ], gBinTop[ ], and gBinX[ ] are unspecified.

When PDU1 is chosen, the IE1 burst is mapped 80 to the control area of the virtual frame 60. The FFR algorithm then reviews 82 the bins between gBinStart and gBinRmost to determine if there is an existing bin big enough (in the virtual frame 60) to accommodate PDU1. In this case, the FFR algorithm does not find a bin that is big enough to accommodate PDU1 (since gBinRmost=−1 is less than gBinStart=0). Thus, the FFR algorithm creates 64 bin #0 in the data space of the frame and PDU1 is mapped thereto. At this point, gBinStart=0, gBinRmost=0, gDLBzoneWidth=2, gDmapBytes=6, gBwa=162, gBinWidth[0]=2, gBinTop[0]=2, gBinX[0]=0.

Upon selection of PDU2, the IE2 burst is mapped 80 to the control area of the virtual frame 60. The FFR algorithm then reviews 82 the bins between gBinStart and gBinRmost to determine if there is an existing bin big enough (in the virtual frame 60) to accommodate PDU2. Although bin #0 exists, its capacity is not enough for PDU2. Hence, bin #1 (of width=3 slots) is created 84 in the data area of the virtual frame 60 and PDU2 is mapped thereto. At this point, gBinStart=0, gBinRmost=1, gDLBzoneWidth=5, gDmapBytes=12, gBWa=129, gBinWidth[0]=2, gBinTop[0]=2, gBinX[0]=0, gBinWidth[1]=3, gBinTop[1]=10, gBinX[1]=2.

After PDU3 is mapped, we have gBinStart=0, gBinRmost=1, gDLBzoneWidth=5, gDmapBytes=18, gBWa=117, gBinWidth[0]=2, gBinTop[0]=8, gBinX[0]=0, gBinWidth[1]=3, gBinTop[1]=10, gBinX[1]=2. After PDU4, is mapped we have gBinStart=0, gBinRmost=1, gDLBzoneWidth=5, gDmapBytes=24, gBWa=111, gBinWidth[0]=2, gBinTop[0]=11, gBinX[0]=0, gBinWidth[1]=3, gBinTop[1]=10, gBinX[1]=2.

Figure 13:
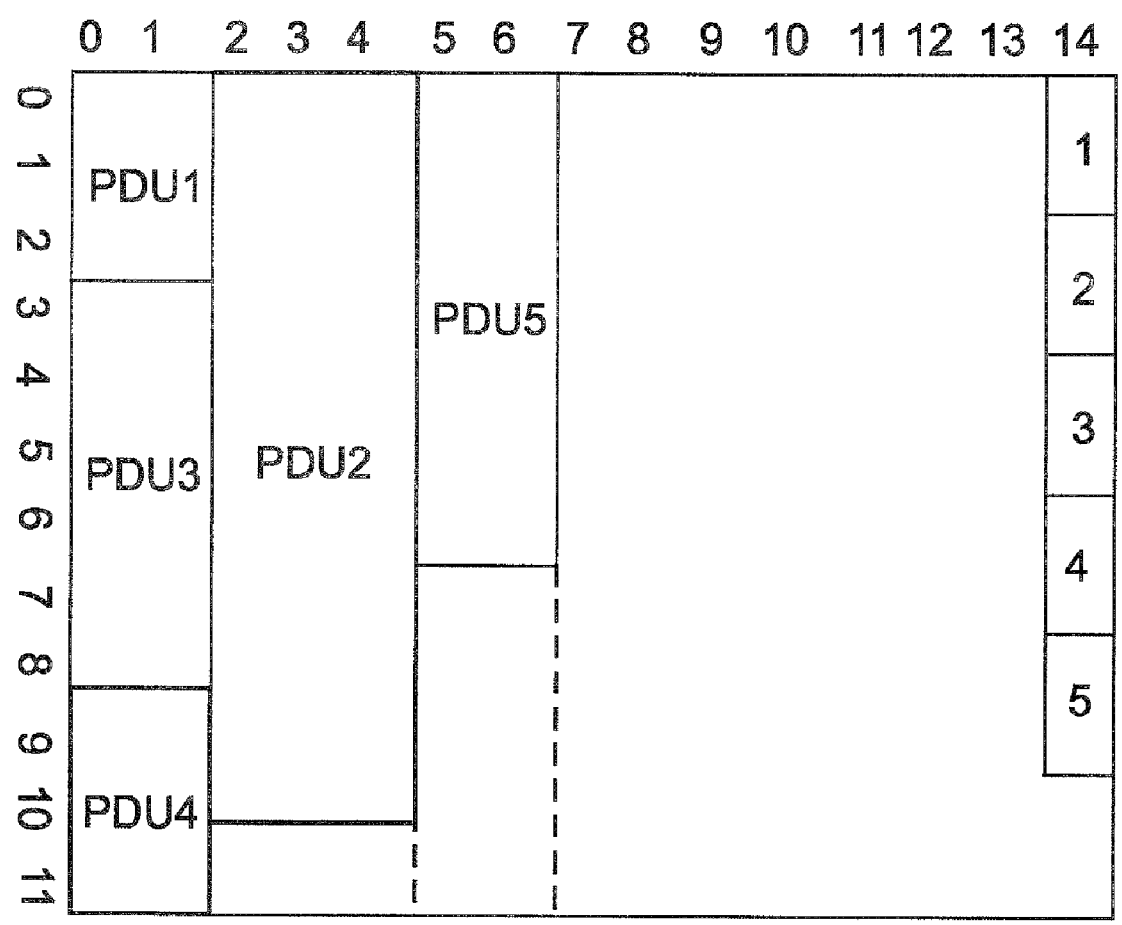
FIG. 13 is a block diagram of a frame used in a numerical example of the FFR algorithm shown in FIG. 12.

Similarly, after creating bin #2 for PDU5, we have gBinStart=0, gBinRmost=1, gDLBzoneWidth=7, gDmapBytes=24, gBWa=97, gBinWidth[0]=2, gBinTop[0]=11, gBinX[0]=0, gBinWidth[1]=3, gBinTop[1]=10, gBinX[1]=2, gBinWidth[2]=2, gBinTop[2]=6, gBinX[1]=5. In particular, the result so far is illustrated in FIG. 13.

(c) FED Algorithm (frameMappingSeg( ))

Figure 14:
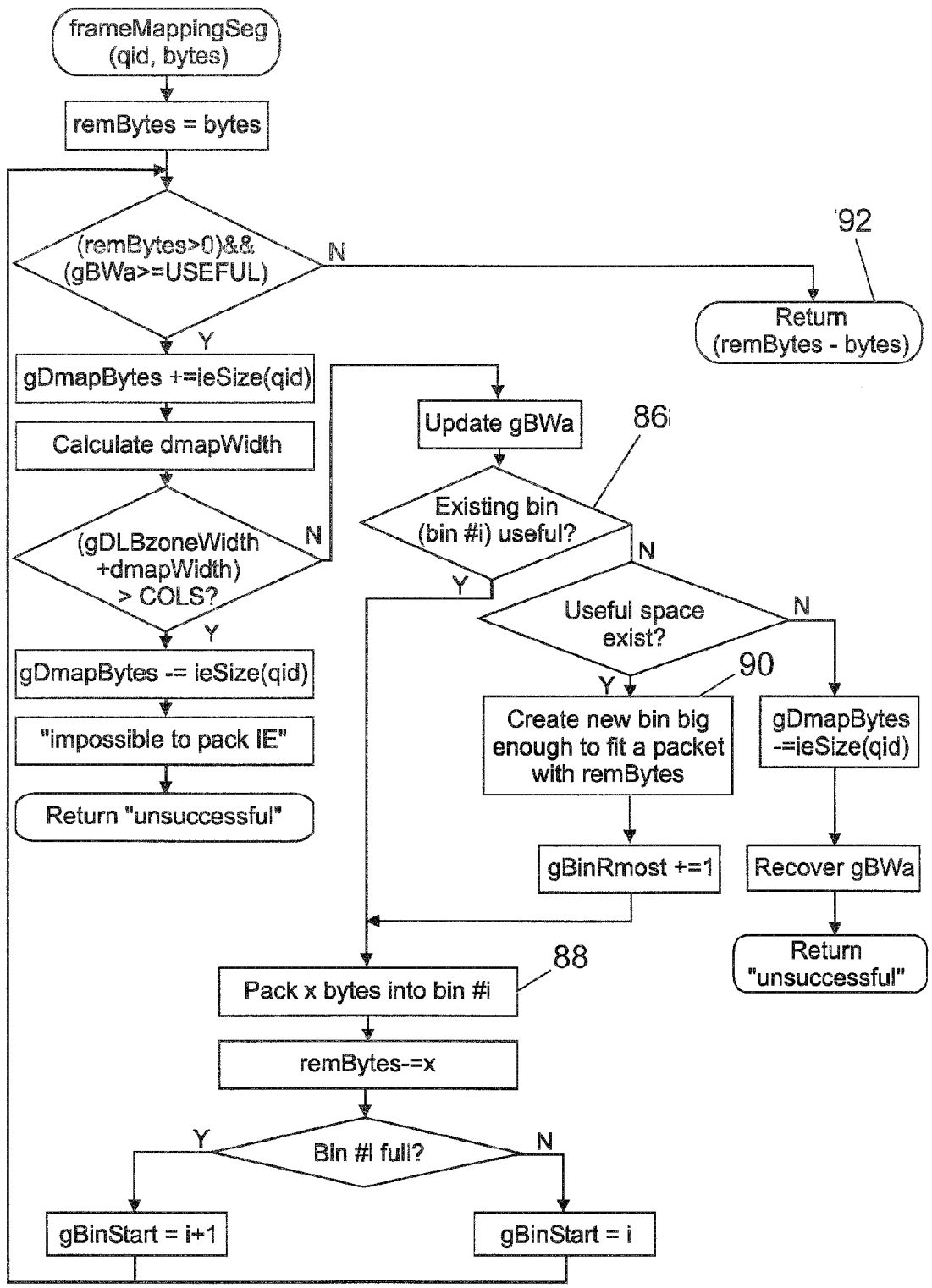
FIG. 14 is a flowchart of the FED or frameMappingSeg( ) algorithm, in accordance with an embodiment of the invention, given by way of example, which performs the mapping shown in FIG. 10.

The FED algorithm implements the sequential laying method in a manner which guarantees that a given SDU is mapped either completely or partially as long as there is bandwidth available. In particular, referring to FIG. 14, the FED algorithm firstly maps an IE into the control area of the virtual frame 60 and then reviews 86 the bins between gBinStart and gBinRmost to determine if there is an existing bin (in the virtual frame 60) big enough to accommodate a given SDU. If a bin with useful space is found, it maps 88 the SDU in whole or in part thereto. If a bin with useful space is not found, the FED algorithm creates 90 a bin new big enough (with the limitation of available bandwidth gBWa) in the open area of the virtual frame 60 and continues to map 88 the SDU thereto until either the SDU is mapped or no bandwidth is left. The algorithm returns 92 the number of bytes mapped in the SDU. Therefore, the scheduler can use it to update QoS information. It will be appreciated that segmentation causes additional IE bursts.

Numerical Example of frameMappingSeg( ) Algorithm

As before, let a virtual frame be represented as a 12×15 matrix. Further, let a slot contain 3 bytes, and an IE burst on the average comprise 6 bytes. Similarly, let a service flow comprise five packets (PDU1-PDU5) wherein PDU1, PDU2, PDU3, PDU4 and PDU5 are respectively 6, 33, 12, 6 and 14 slots in size. The FED algorithm creates bins of two slots wide as long as there is enough space in the virtual frame 60. Initially, gStart=0, gRmost=−1, gDLBzoneWidth=0, and gDmapBytes=0. gBinWidth[ ], gBinTop[ ], and gBinX[ ] are unspecified.

When PDU1 is chosen, the IE1 burst is mapped to the control area of the virtual frame 60. On reviewing 66 the bins between gBinStart and gBinRmost to determine if there is an existing bin big enough to accommodate PDU1, no existing bin is found since gBinRmost=−1 is less than gBinStart=0. Thus, bin #0 is created 70 and PDU1 is mapped 68 thereto. At this point, gBinStart=0, gBinRmost=0, gDLBzoneWidth=2, gDmapBytes=6, gBwa=162, gBinWidth[0]=2, gBinTop[0]=2, gBinX[0]=0.

Upon selection of PDU2, an existing bin, bin #0, is found but only part of the packet (18 slots) can be mapped thereto. In this case, a burst IE2' is generated, the part of PDU (PDU2') is mapped to bin #0 which is filled thereby. At this point, gBinStart=1, gBinRmost=1, gDLBzoneWidth=2, gDmapBytes=12, gBWa=144, gBinWidth[0]=2, gBinTop[0]=11, gBinX[0]=0. Because only part of PDU2 is mapped to the virtual frame 60, remBytes (=15 slots×3 bytes/slot)=75 bytes>0, the loop continues. Since gBinStart=1 while gBinRmost=0, this means there is no existing bin available (in the virtual frame 60). Thus, a new bin (i.e. bin #1) big enough to accommodate the remaining portion of PDU2 (i.e. PDU") is created. PDU2" is mapped to the new bin, and an additional IE burst, IE2" is mapped to the control area. At this point, gBinStart=1, gBinRmost=1, gDLBzoneWidth=4, gDmapBytes=18, gBWa=128, gBinWidth[0]=2, gBinTop[0]=11, gBinX[0]=0, gBinWidth[1]=2, gBinTop[1]=7, gBinX[1]=2.

After PDU3 is mapped as PDU3' and PDU3", we have gBinStart=2, gBinRmost=2, gDLBzoneWidth=6, gDmapBytes=30, gBWa=104, gBinWidth[0]=2, gBinTop[0]=11, gBinX[0]=0, gBinWidth[1]=2, gBinTop[1]=11, gBinX[1]=2, gBinWidth[2]=2, gBinTop[2]=1, gBinX[2]=4. Similarly, after PDU4, we have gBinStart=2, gBinRmost=2, gDLBzoneWidth=6, gDmapBytes=36, gBWa=98, gBinWidth[0]=2, gBinTop[0]=11, gBinX[0]=0, gBinWidth[1]=2, gBinTop[1]=11, gBinX[1]=2, gBinWidth[2]=2, gBinTop[2]=4, gBinX[2]=4.

Figure 15:
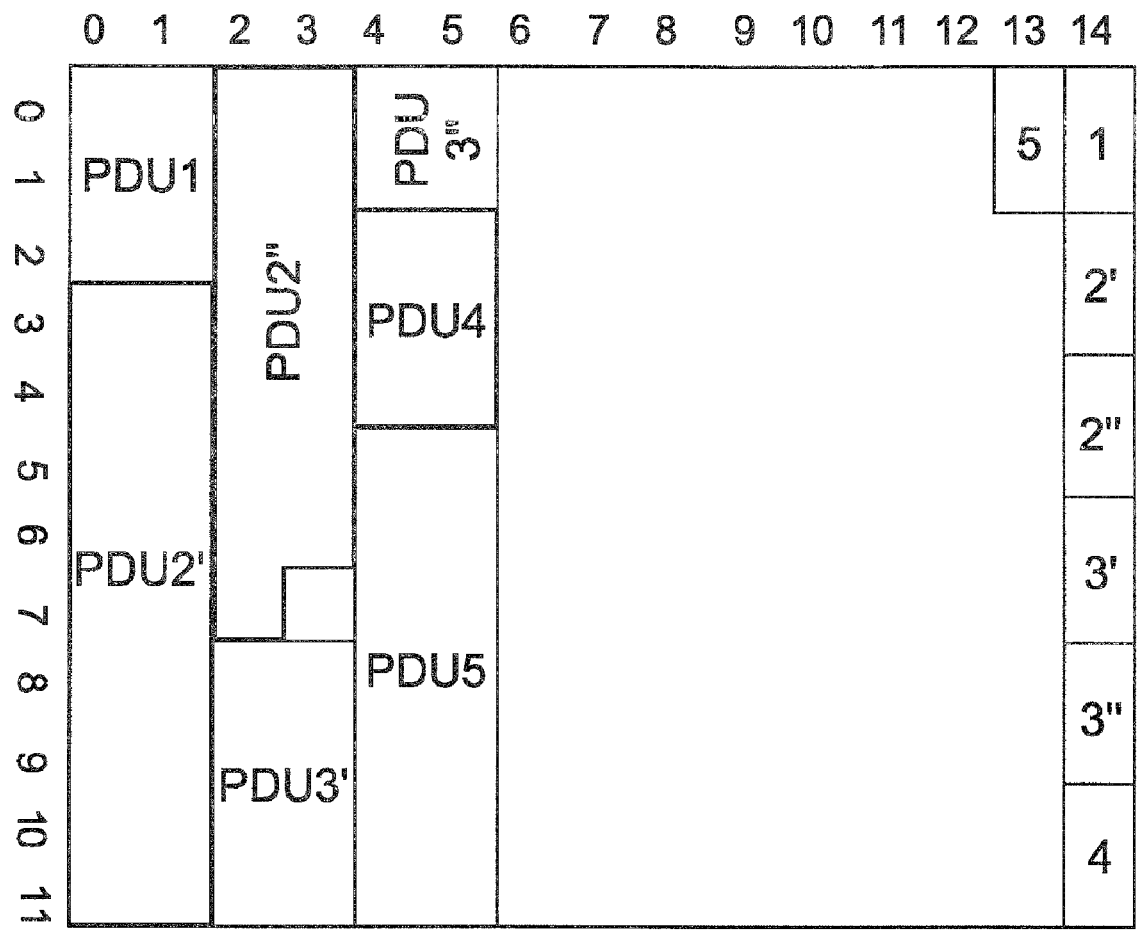
FIG. 15 is a block diagram of a frame used in a numerical example of the FED algorithm shown in FIG. 14.

A new column in the data area is needed when PDU5 is mapped. At this point, we have gBinStart=3, gBinRmost=2, gDLBzoneWidth=6, gDmapBytes=42, gBWa=72, gBinWidth[0]=2, gBinTop[0]=11, gBinX[0]=0, gBinWidth[1]=2, gBinTop[1]=11, gBinX[1]=2, gBinWidth[2]=2, gBinTop[2]=11, gBinX[2]=4 (as shown in FIG. 15).

4. Method of Optimising Bandwidth Efficiency

Figure 16:
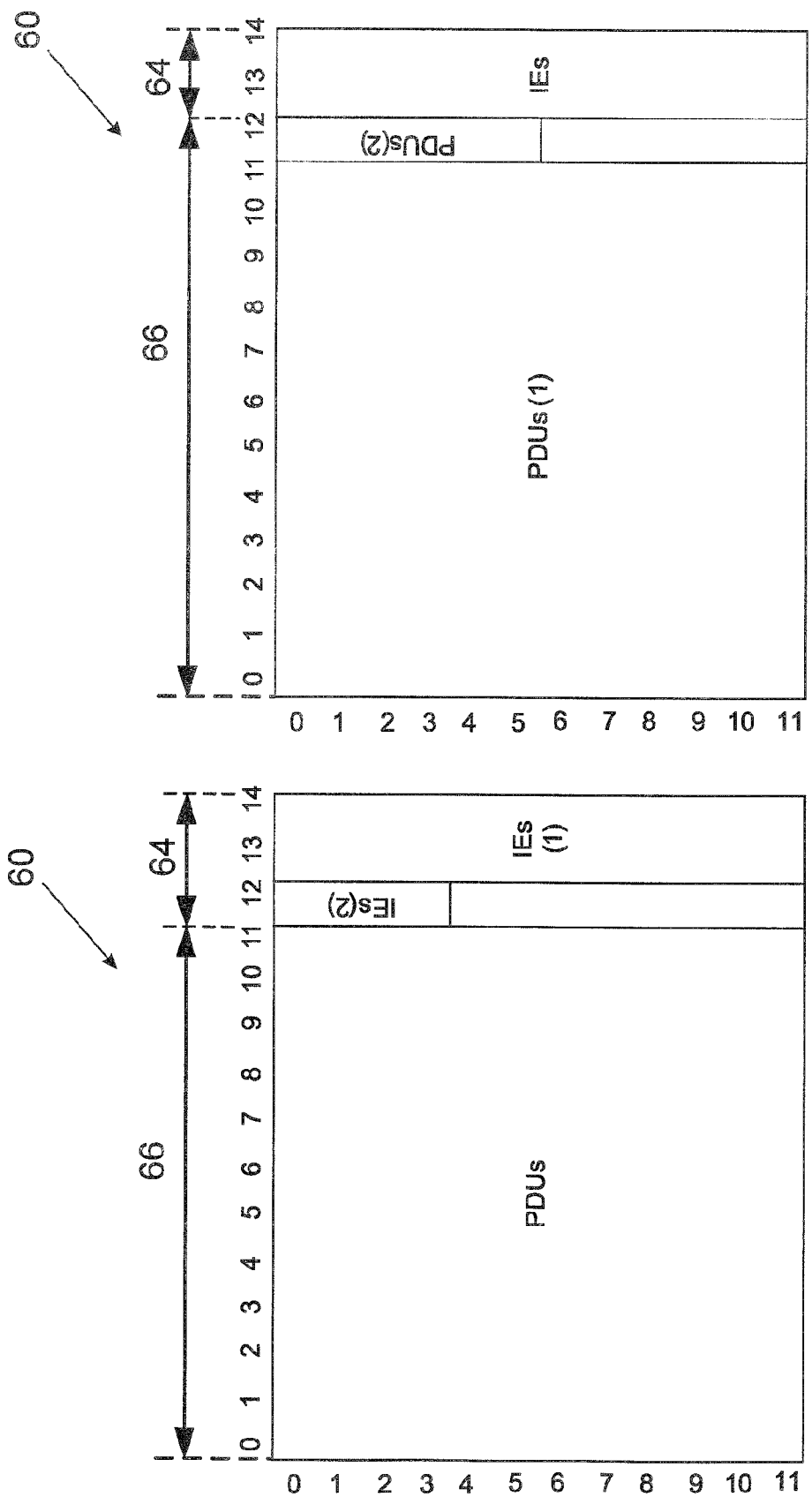
FIG. 16 is a block diagram of a virtual frame, in accordance with an embodiment of the invention, given by way of example, in which a bin next to a control area in the frame has a width of one slot.

By forcing the last bin (i.e. the bin next to the control area), to have a width of one slot, the average emptiness of the bin is half that of the column (i.e. half of the bin is empty on the average). However, it is worth noting that there are two possible scenarios for this condition as shown in FIG. 16. In one scenario (shown in FIG. 16a) the data area 66 of the virtual frame 60 is full. In the other scenario (shown in FIG. 16b) the control area 64 of the virtual frame 60 is full. Although there is a chance that all the bins are mapped in full and there is no empty area left, a chance exists that no packet can be packed into the final bin shown in FIG. 17 wherein the mapping of an IE burst leaves no room for a PDU burst. The percentage of empty area is very low (<3% worst case average, <1% for most case average) in the real WiMAX application (See Table 10 of WiMAX Forum, "WiMAX Forum™ Mobil System Profile", July, 2006) but it is still possible to further map more packets into the virtual frame 60.

Figure 17:
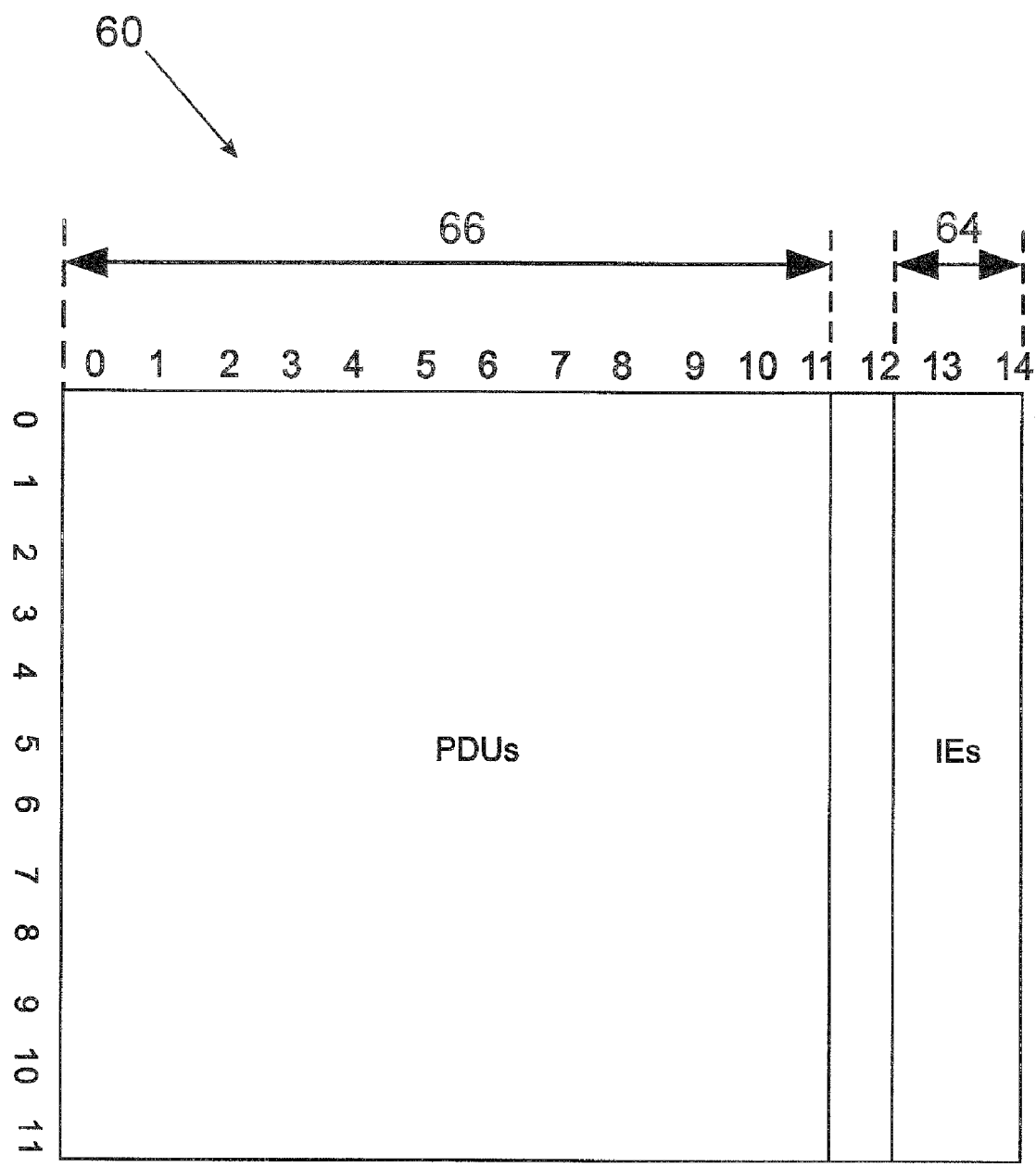
FIG. 17 is a block diagram of a virtual frame, in accordance with an embodiment of the invention, given by way of example, in which a packet cannot be packed into the frame's final bin.
Figure 18B:
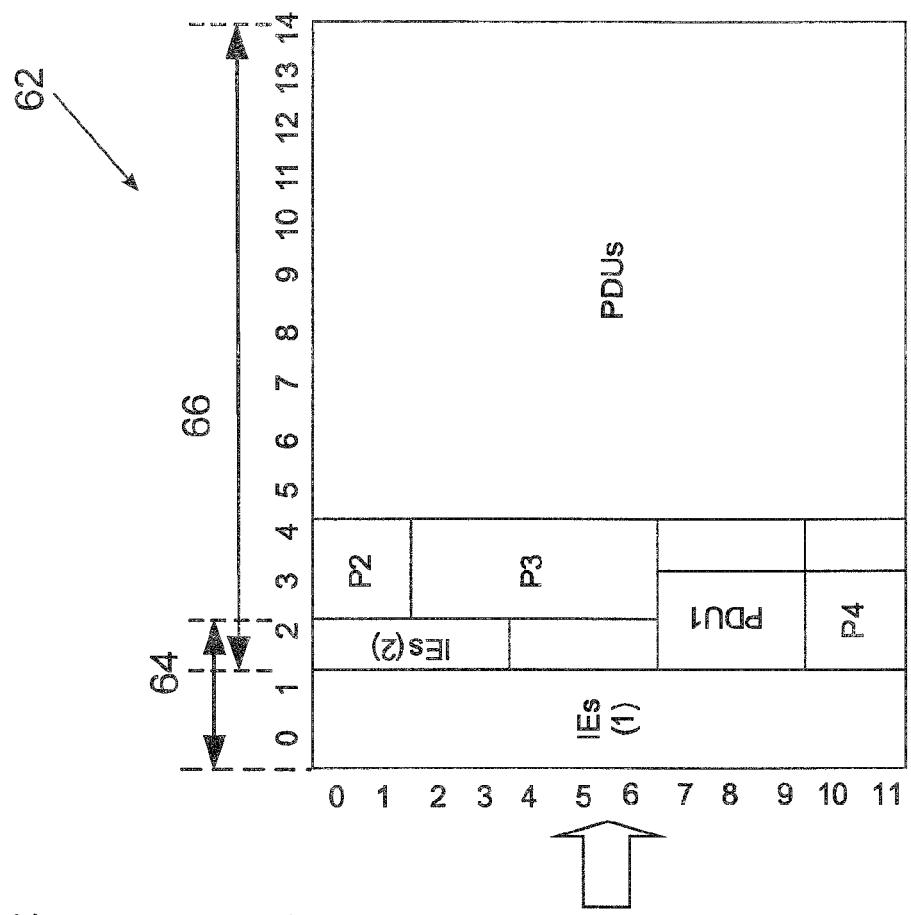
FIG. 18 is a block diagram of a mechanism, in accordance with an embodiment of the invention, given by way of example, for optimising bandwidth on a control area of a real WiMAX frame shown in FIG. 3.
Figure 18A:
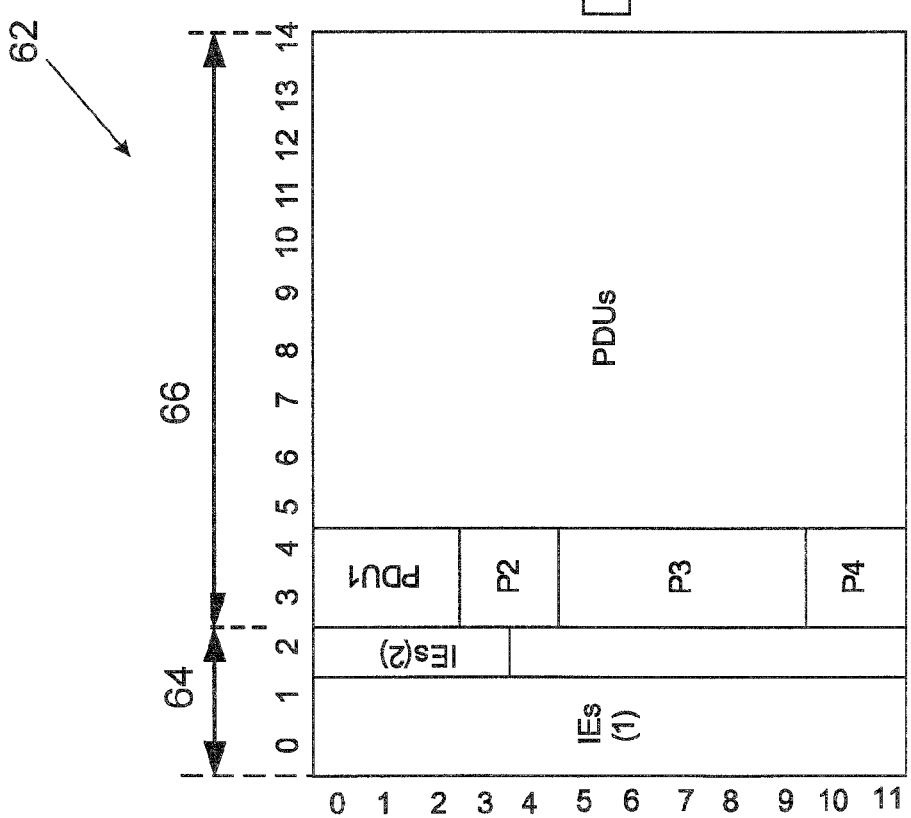

In the case of FIGS. 16(a) and 17, one potential approach is to first transform the virtual frame 60 into the real WiMAX frame (see FIG. 10) and then manipulate bin #0 to free some space in the data area as shown in FIG. 18. This makes squeezing more PDUs possible.

Figure 19:
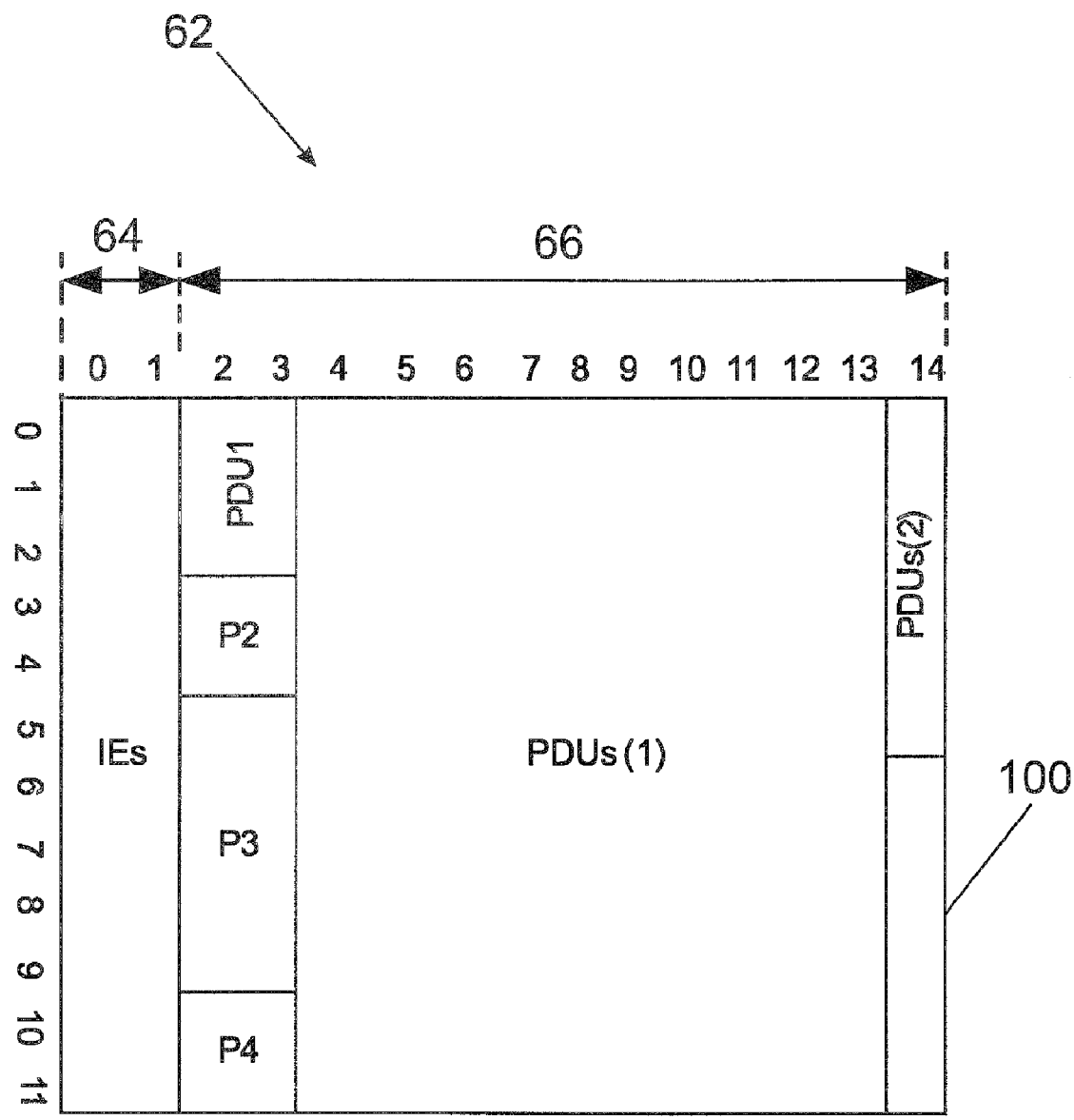
FIG. 19 is a block diagram of a real WiMAX frame, in accordance with an embodiment of the invention, given by way of example, in which a control area of its virtual frame is full.
Figure 20:
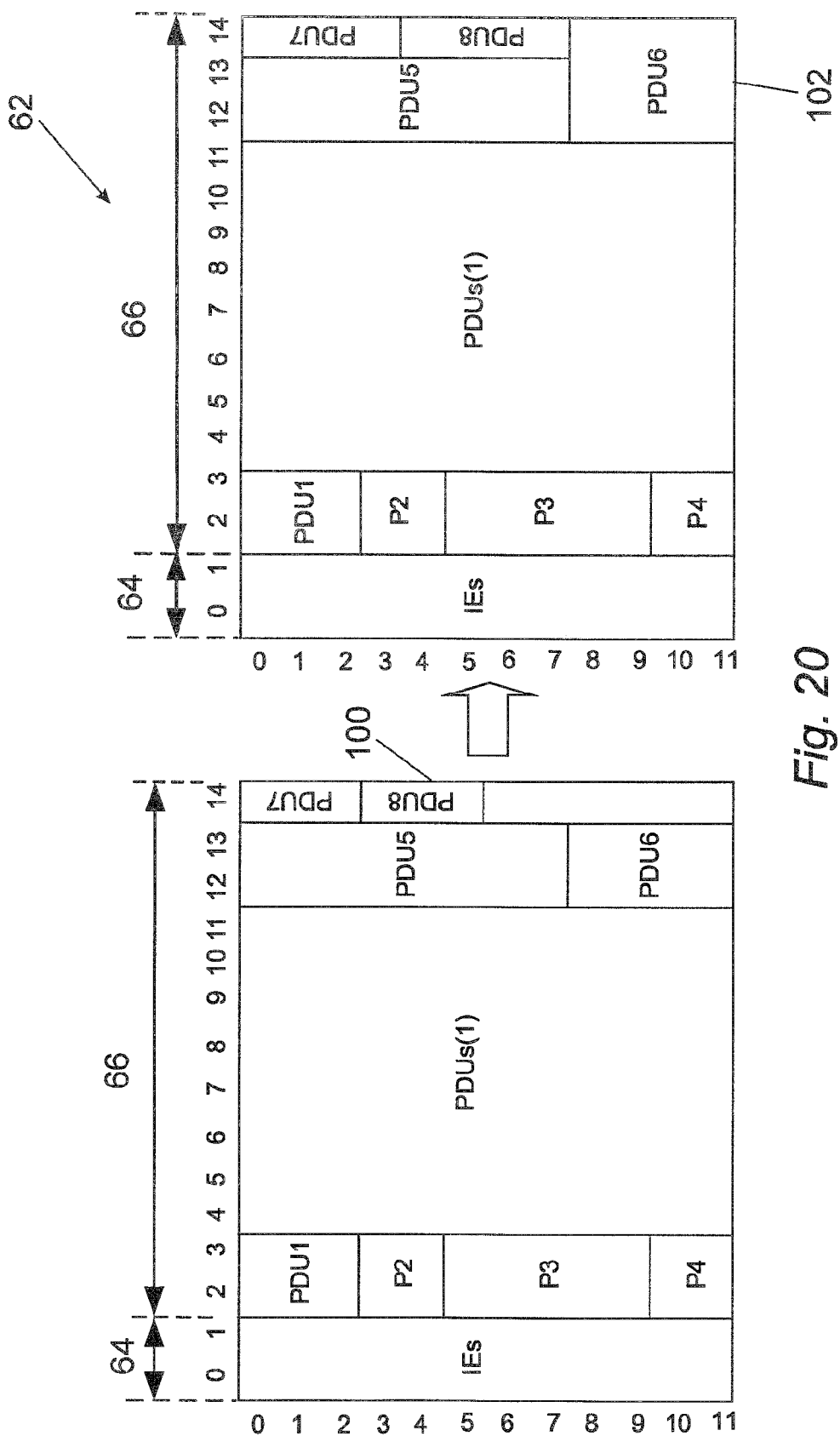
FIG. 20 is a block diagram of mechanism, in accordance with an embodiment of the invention, given by way of example, for optimising the bandwidth on the data area of a real WiMAX frame shown in FIG. 3.

The optimisation of the case of FIG. 16(b) isn't as trivial as that in FIG. 18 because the column with empty slots is at the far right 100 as shown in FIG. 19. It appears that there is no obvious trial-and-error way to move bursts around to free space for new IE bursts. A feasible way is to extend bursts 102 neighbouring the empty area as shown FIG. 20. In conclusion, further optimisation is possible after applying the frame-mapping algorithm to further reduce the small percentage of emptiness in a frame.

5. Applying the Algorithms to "Grouping" Problem

In some implementation, it is desirable for bursts having the same MS or the same DUIC to be merged together to save bandwidth in the control area. This requirement is justified especially for traffic with small packets (namely rtPS or ErtPS in WiMAX) because the grouped packets share the same IE burst, and thus, save bandwidth overall. To group packets with the same feature together, a reverse table (MSid/DUICid→bin#) is needed to index the desired bin number to which a flow is directed by the scheduler. If the bin is full after mapping, the bin number in this entry is deleted. If a new bin is created, its bin number is inserted into the entry indexed by MSid/DUICid.

More particularly, a procedure for grouping packets with the same feature together comprises the steps of:

(1) building a reverse table for MS/DIUC 4 bin number mapping;
   (a) Indexing for MS
   (b) Indexing for DIUC
(2) looking up the reverse table to find the bin number from either MS or DIUC;
(3) doing frameMappingSeg( )/frameMappingFF( ) from the (first) same MS/DIUC bin;
(4) If a new bin is created, adding its bin number into the reverse table
(5) if a bin is full after mapping, deleting its bin number from the MS/DUIC entry in the reverse table
(6) If bin creation is not possible, doing frameMappingSeg( )/frameMappingFF( ) from gBinStart as long as there is bandwidth available and adding the last bin number into the reverse table if the bin is not full.

With moderate effort, the above procedure can be integrated into the current frame mapping procedures.

Alterations and modifications may be made to the above without departing from the scope of the invention.

The invention claimed is:

1. A method of packing an orthogonal frequency division multiple access/time division multiple access (OFDMA/TDMA) frame comprising sub carriers grouped into sub channels and time slots containing OFDM symbols, wherein the OFDMA/TDMA frame is modeled as a matrix with rows corresponding to the sub channels and columns corresponding to the OFDM symbols, comprising:

creating the matrix having a same number of rows and columns as the OFDMA/TDMA frame;

mapping a first control message to a position in a first corner of the matrix;

mapping a first data message to a position in a second corner of the matrix, wherein the second corner is at an opposite end of a row of the matrix in a predetermined direction from the first corner;

mapping, by a base station device, a plurality of further control messages to the matrix in a first direction moving away from the first corner downward in a first column associated with the first corner until the first column is filled and then to a next available column closer to the second corner;

mapping, by the base station device, a plurality of further data messages to the matrix in a second direction that is different from the first direction, away from the second corner of the matrix downward in a second column associated with the second corner until the second column is filled and then to another available column closer to the first corner; until one or more of the further data messages meets one or more of the further control messages;

providing the control messages from the matrix so that the first control message is located at the start of the OFDMA/TDMA frame; and providing the data messages from the matrix so that the first data message is located directly after the control messages in the OFDMA/TDMA frame.

2. The method as claimed in claim 1, wherein the method further comprises:

reviewing partitions in the matrix to determine if there is a partition large enough accommodate a given data message;

generating a second control message for the given data message, mapping the second control message to the matrix and mapping the given data message to the partition in an event that the partition is large enough to accommodate the data message;

creating a new partition of size large enough to accommodate the given data message, in a free area of the matrix, in the event that the partition large enough to accommodate the given data message is not found;

generating a third control message for the given data message, mapping the third control message to the matrix, and mapping the given data message to the new partition; and returning a message regarding an outcome of a mapping process.

3. The method as claimed in claim 1, wherein the method further comprises:

reviewing partitions in the matrix to determine if there is a partition large enough to accommodate a given data message;

generating a second control message for the given data message, mapping the second control message to the matrix and mapping the given data message to the partition in an event that the partition is large enough to accommodate the given data message;

determining what portion of the given data message can be accommodated in a largest partition in the event that the partition large enough to accommodate an entire data message is not found;

generating a third control message for the portion of the given data message, mapping the third control message to the matrix, and mapping the portion of the given data message to the largest partition;

creating a new partition of a size large enough to accommodate a remaining portion of the given data message, in a free area of the matrix;

generating a fourth control message for the remaining portion of the given data message, mapping the fourth control message to the matrix, and mapping the remaining portion of the given data message to the new partition; and returning a message regarding an outcome of a mapping process.

4. The method as claimed in claim 1 further comprising: performing a further optimisation of partitions in the OFDMA/TDMA frame.

5. The method as claimed in claim 4 wherein performing the further optimisation comprises moving at least some of the data messages into at least part of the first area of the OFDMA/TDMA frame, to free space in the second area of the OFDMA/TDMA frame.

6. The method as claimed in claim 4 wherein performing the further optimisation comprises extending data messages neighbouring empty areas in the OFDMA/TDMA frame.

7. The method as claimed in claim 1 wherein the data messages comprise service data unit (SDU) from a media access control (MAC) layer of the OFDMA/TDMA frame, and the step of mapping the data messages to the matrix is preceded encapsulating the SDU in a protocol data unit (PDU).

8. The method as claimed in claim 1 further comprising: grouping data messages sharing a same feature prior to mapping the data messages to the matrix.

9. The method as claimed in claim 2 further comprising: a further optimisation of partitions in the FDMA/TDMA frame.

10. The method as claimed in claim 3 further comprising: a further optimisation of partitions in the OFDMA/TDMA frame.

11. The method as claimed in claim 5 wherein the data messages comprise service data unit (SDU) from a media access control (MAC) layer of the OFDMA/TDMA frame, and the step of mapping the data messages to the matrix is preceded encapsulating the SDU in a protocol data unit (PDU).

12. The method as claimed in claim 2 further comprising: grouping data messages sharing a same feature prior to mapping the data messages to the matrix.

13. The method as claimed in claim 3 further comprising: grouping data messages sharing a same feature prior to mapping the data messages to the matrix.

14. The method as claimed in claim 4 further comprising: grouping data messages sharing a same feature prior to mapping the data messages to the matrix.

15. The method as claimed in claim 5 further comprising: grouping data messages sharing a same feature prior to mapping the data messages to the matrix.

16. The method as claimed in claim 6 further comprising: grouping data messages sharing a same feature prior to mapping the data messages to the matrix.

17. The method as claimed in claim 7 further comprising: grouping data messages sharing a same feature prior to mapping the data messages to the matrix.

18. The method as claimed in claim 2 wherein the data messages comprise service data unit (SDU) from the MAC layer of the OFDMA/TDMA frame, and the step of mapping the data messages to the matrix is preceded encapsulating the SDU in a protocol data unit (PDU).

19. The method as claimed in claim 3 wherein the data messages comprise service data unit (SDU) from a media access control (MAC) layer of the OFDMA/TDMA frame, and the step of mapping the data messages to the matrix is preceded encapsulating the SDU in a protocol data unit (PDU).

20. A base station device comprising:
a memory to store a matrix associated with an orthogonal frequency division multiple access/time division multiple access (OFDMA/TDMA) frame comprising sub carriers grouped into sub channels and time slots containing OFDM symbols, wherein the matrix includes rows corresponding to the sub channels and columns corresponding to the OFDMA symbols; and
a processing circuit in communication with memory, the processing circuit to create the matrix having a same number of rows and columns as the OFDMA/TDMA frame, to map a first control message to a position in a first corner of the matrix, to map a first data message to a position in a second corner of the matrix, wherein the second corner is at an opposite end of a row of the matrix in a predetermined direction from the first corner, to map a plurality of further control messages to the matrix in a first direction moving away from the first corner downward in a first column associated with the first corner until the first column is filled and then to a next available column closer to the second corner, to map a plurality of further data messages to the matrix in a second direction that is different from the first direction, away from the second corner of the matrix downward in a second column associated with the second corner until the second column is filled and then to another available column closer to the first corner, until one or more of the further data messages meets one or more of the further control messages, to provide the control messages from the matrix so that the first control message is located at the start of the OFDMA/TDMA frame, and to provide the data messages from the matrix so that the first data message is located directly after the control messages in the OFDMA/TDMA frame.

\* \* \* \* \*